(12) United States Patent  (10) Patent No.: US 12,546,638 B2
Zhu et al.  (45) Date of Patent: Feb. 10, 2026

(54) VIBRATION-TYPE MEASURING TRANSDUCER AND VIBRONIC MEASURING SYSTEM FORMED THEREWITH

(71) Applicant: Endress+Hauser Flowtec AG, Reinach (CH)

(72) Inventors: Hao Zhu, Freising (DE); Gerhard Eckert, Grenzach-Wyhlen (DE); Ennio Bitto, Aesch (CH); Alfred Rieder, Landshut (DE); Marc Werner, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 391 days.

(21) Appl. No.: 17/612,540

(22) PCT Filed: Apr. 15, 2020

(86) PCT No.: PCT/EP2020/060589
§ 371 (c)(1),
(2) Date: Nov. 18, 2021

(87) PCT Pub. No.: WO2020/239319
PCT Pub. Date: Dec. 3, 2020

(65) Prior Publication Data
US 2022/0236160 A1   Jul. 28, 2022

(30) Foreign Application Priority Data
May 28, 2019 (DE) ............ 10 2019 114 330.6

(51) Int. Cl.
*G01F 1/84* (2006.01)
*G01N 9/00* (2006.01)

(52) U.S. Cl.
CPC .......... *G01F 1/8477* (2013.01); *G01F 1/8409* (2013.01); *G01F 1/8422* (2013.01); *G01N 2009/006* (2013.01)

(58) Field of Classification Search
CPC ............................ G01F 1/8472; G01F 1/8477
See application file for complete search history.

(56) References Cited

U.S. PATENT DOCUMENTS

| 2011/0167907 A1 | 7/2011 | Bitto et al. |
| 2012/0192658 A1 | 8/2012 | Hussain et al. |

(Continued)

FOREIGN PATENT DOCUMENTS

| CN | 102667421 A | 9/2012 |
| CN | 102735299 A | 10/2012 |

(Continued)

OTHER PUBLICATIONS

Bitto et al., Connection Device for Mechanically Connecting an Electronics Housing and a Transducer Housing, Transducer Having a Connection Device of This Type or Field Device Formed With Same, WO 2017/097526 A1, Jun. 2017, FIT Computer Translation (Year: 2017).*

*Primary Examiner* — Erika J. Villaluna
(74) *Attorney, Agent, or Firm* — Christopher R. Powers; Endress+Hauser (USA) Holding, Inc.

(57) ABSTRACT

A measuring transducer includes a tube assembly including two pair of structurally identical tubes, each connected at their respective ends to each of two flow dividers, thereby forming four parallel flow paths, and each including alternating, adjoining straight and arcuate segments, wherein each of the first and third arcuate segments has a segment length corresponding to an extended length of a virtual center line of the segment, an arc radius corresponding to a radius of the virtual center line and a center point angle corresponding to a ratio between the segment length and the (Continued)

arc radius, such that each of the first arcuate segments are identical in both shape and size, and such that each of the third arcuate segments are identical in both shape and size, wherein the measuring transducer further includes an exciter assembly and a sensor assembly, each connected to the tube assembly.

28 Claims, 10 Drawing Sheets

(56) References Cited

U.S. PATENT DOCUMENTS

| | | |
|---|---|---|
| 2012/0279317 A1 | 11/2012 | Bitto et al. |
| 2017/0261474 A1 | 9/2017 | Zhu et al. |
| 2017/0356777 A1* | 12/2017 | Zhu ................. G01F 1/8436 |

FOREIGN PATENT DOCUMENTS

| | | | |
|---|---|---|---|
| CN | 103900652 A | 7/2014 | |
| CN | 107110686 A | 8/2017 | |
| CN | 107209039 A | 9/2017 | |
| CN | 107290015 A | 10/2017 | |
| DE | 102015104931 A1 | 6/2016 | |
| WO | 2016091478 A1 | 6/2016 | |
| WO | WO-2017097526 A1 * | 6/2017 | ........... G01D 11/245 |
| WO | 2019120780 A1 | 6/2019 | |

* cited by examiner

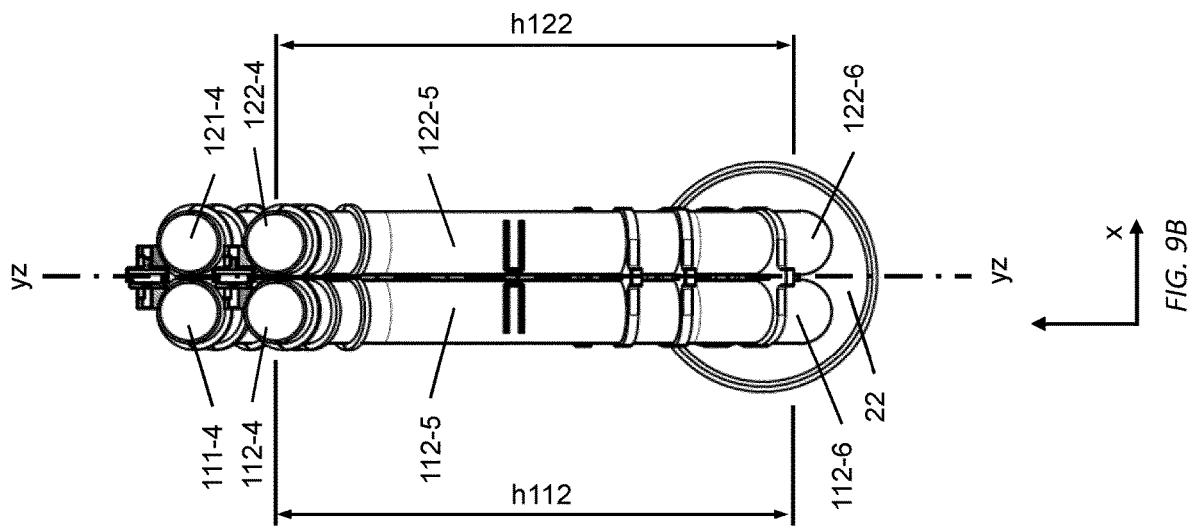
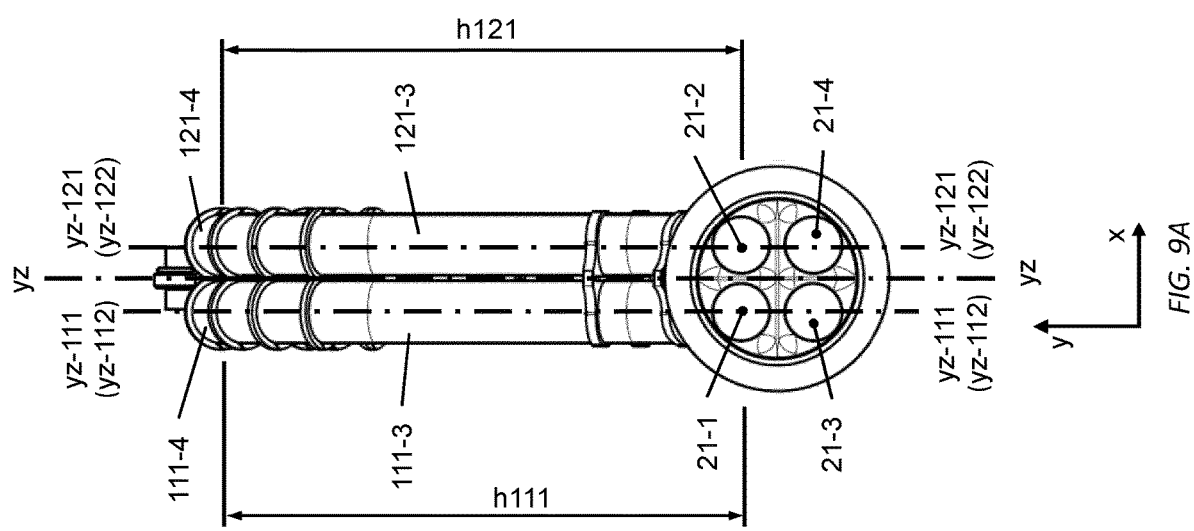
FIG. 9B
FIG. 9A

VIBRATION-TYPE MEASURING TRANSDUCER AND VIBRONIC MEASURING SYSTEM FORMED THEREWITH

CROSS-REFERENCE TO RELATED APPLICATIONS

The present application is related to and claims the priority benefit of DE Patent Application No. 10 2019 114 330.6, filed on May 28, 2019, and International Patent Application No. PCT/EP2020/060589, filed on Apr. 15, 2020, the entire contents of which are incorporated herein by reference.

TECHNICAL FIELD

The invention relates to a measuring transducer that is especially suitable for a vibronic measuring system serving to measure at least one measured variable of a flowing fluid, with a tube assembly formed by means of four curved tubes structurally identical only in pairs as well as two flow dividers each having four flow openings, and to a vibronic measuring system formed by means of such a measuring transducer for measuring at least one measured variable, namely, for example, a flow parameter, such as a mass flow or a volume flow, or a substance parameter, such as a density or a viscosity, of a flowing fluid. The invention also relates to a vibronic measuring system formed with such a measuring transducer.

BACKGROUND

In industrial measurement technology, especially also in connection with the regulation and monitoring of automated process-engineering processes, vibronic measuring systems respectively formed by means of a transformer circuit formed mostly by means of at least one microprocessor, and a vibration-type measuring transducer which is electrically connected to said transformer circuit and through which the medium to be measured flows during operation, namely, for example, Coriolis mass flow meters, are often times used for the highly accurate determination of a mass flow rate of a medium, e.g., a liquid, a gas, or a dispersion, flowing in a process line, e.g., a pipeline. Vibration-type measuring transducers or vibronic measuring systems formed therewith are described, for example, in US-A 2012/0192658, US-A 2017/0261474, US-A 2017/0356777, or in unpublished international patent application PCT/EP2018/081298. The tube assembly of such a measuring transducer accordingly has a curved first tube, a second tube structurally identical to said first tube, a curved third tube, and a fourth tube structurally identical only to said third tube. In addition, the aforementioned tube assembly has a first flow divider which serves, for example, as a line branching unit during operation, with four, here precisely four, flow openings and a second flow divider which is structurally identical thereto and serves, for example, as a line merging unit during operation, with four, here likewise precisely four, flow openings. Each of the aforementioned, here precisely, four tubes respectively extends from a respective first end to a respective second end with a respective tube length corresponding to an extended length or a length of its respective center line, and moreover respectively has a lumen which is enclosed by a tube wall, typically a metallic tube wall, and respectively extends from the respective first end of the respective tube to the respective second end of said tube, wherein the tube wall is typically monolithic, i.e., the tube formed therewith is typically formed in one piece. Moreover, the four tubes belonging to one of the aforementioned tube assemblies each have an identical caliber (inner diameter) and, for the purpose of forming four parallel flow paths, each of the tubes is respectively connected to each of the two flow dividers in such a way that the first tube opens with its first end into a first flow opening of the first flow divider and with its second end into a first flow opening of the second flow divider, the second tube opens with its first end into a second flow opening of the first flow divider and with its second end into a second flow opening of the second flow divider, the third tube opens with its first end into a third flow opening of the first flow divider and with its second end into a third flow opening of the second flow divider, and the fourth tube opens with its first end into a fourth flow opening of the first flow divider and with its second end into a fourth flow opening of the second flow divider. The tubes of the tube assembly are respectively formed, for example by bending, such that each of the first, second, third, and fourth tubes ultimately respectively has a tube shape located in a (bending) plane, and the tube wall of each of the tubes typically consists of the same material, such as a stainless steel or a nickel-based alloy.

Each of the tubes moreover respectively has a first imaginary plane of symmetry and a second imaginary plane of symmetry perpendicular thereto, and each of the tubes is shaped such that it is respectively mirror-symmetrical both to the associated first plane of symmetry and to the associated second plane of symmetry, for example in such a way that each of the aforementioned tubes is ultimately at least partially substantially V-shaped or has at least partial regions with a substantially V-shaped silhouette. In addition, as quite common in tube assemblies of the aforementioned type, the tubes and flow dividers are designed and arranged such that the respective tube assembly ultimately has a first imaginary plane of symmetry which is located both between the first and second tubes and between the third and fourth tubes and with respect to which the tube assembly is mirror-symmetrical, and that the tube assembly has a second imaginary plane of symmetry which is perpendicular to said first imaginary plane of symmetry but nevertheless imaginarily intersects each tube and with respect to which the tube assembly is likewise mirror-symmetrical. Moreover, the tubes are arranged such that from the first imaginary plane of symmetry, the first tube has a smallest distance which is equal to a smallest distance that the third tube has from the first imaginary plane of symmetry, and that from the first imaginary plane of symmetry, the third tube has a smallest distance that is equal to a smallest distance that the fourth tube has from the first imaginary plane of symmetry; this specifically also in such a way that the first and second tubes are parallel to one another or to the first imaginary plane of symmetry and that the third and fourth tubes are parallel to one another or to the first imaginary plane of symmetry, for example also in such a way that the first tube and the third tube lie in a common first tube plane and that the second tube and the fourth tube lie in a common second tube plane.

Typically, measuring transducers of the in question and as respectively disclosed in US-A 2012/0192658, US-A 2017/0261474, US-A 2017/0356777, or the international patent application PCT/EP2018/081298, furthermore have a transducer housing encasing their respective tubes and having a mostly hermetically closed cavity within which each tube is arranged. Each of the transducer housings is formed by means of a cylindrical support element, namely, especially, a tubular support element or a support element that is hollow cylindrical at least in sections, and by means of a, for example cap-shaped, casing element. The support element extends from a first end to a second end with a support element length and is mechanically connected, especially bonded, at its first end to the first flow divider and to at its second end to the second flow divider. The casing element in turn is mechanically connected, especially bonded, to the support element. Both the support element and the casing element respectively have a hollow space, which is encased by a, typically metallic, wall and which respectively forms a partial region of the cavity, in such a way that a wall of the casing element together with a segment of the wall of the support element encase a hollow space forming a partial region of the cavity, and that said hollow spaces communicate with one another or transition into one another. For this purpose, a first opening and at least one second opening spaced apart from the first opening along an imaginary envelope line of the wall are respectively provided in the wall of the support element in such a way that each of the first and second openings respectively forms a partial region of the cavity of the transducer housing, and that each of the tubes respectively extends both through the first opening and through the second opening. In the aforementioned measuring transducers, the tube assembly and the transducer housing are moreover respectively designed and positioned such that each of the tubes is arranged only partially within the hollow space of the support element, i.e., is only partially arranged within the hollow space of the casing element.

The tube assembly or the measuring transducer formed therewith is specifically provided or configured to be integrated into the course of a process line designed as a pipeline that conducts a fluid to be measured, namely, for example, a gas, a liquid, or a dispersion, and to be flowed through by said fluid during operation. For this purpose, the measuring transducer can, for example, be integrated into the process line such that the first flow divider of the tube assembly is arranged on the inlet side, i.e., serves as a line branching unit, and that the second flow divider of the tube assembly is arranged on the outlet side, i.e., serves as a line merging unit, and that fluid flows through each of the tubes of the tube assembly in a common flow direction, namely starting from its respective first end in the direction of its respective second end. In addition, each of the aforementioned tubes is respectively configured to conduct the optionally flowing fluid in its respective lumens and, meanwhile, not least in order to cause measurement effects correlated with the at least one measured variable, to be allowed to vibrate, especially in such a way that each of the tubes carries out useful vibrations, namely mechanical vibrations, about a respective rest position with a useful frequency which may also be partially defined by the density of the medium, i.e., can be used as a measure of the density. In conventional measuring systems designed as Coriolis mass flow meters, bending vibrations at a natural resonant frequency typically serve as useful vibrations, for example bending vibrations that correspond to a natural basic bending vibration mode that is intrinsic to the measuring transducer and in which the vibrations of each of the measuring tubes respectively are resonance vibrations that have precisely one vibration loop. In the case of a tube that is curved at least in sections, the useful vibrations are moreover typically formed such that said tube oscillates about an associated imaginary vibration axis imaginarily connecting an inlet-side and an outlet-side end of the tube, in the manner of a cantilever clamped at one end. For the purpose of avoiding contacts, which are harmful for the measurement, of the vibrating tubes with one another or with that of the transducer housing, each of the tubes has only distances from the respective other tubes and from the transducer housing, not least also from a respective edge of each of the two openings provided in the wall of the support element, that respectively enable, under all operating conditions, free vibrations with a sufficient vibration amplitude for the measurement.

In order to induce and maintain forced mechanical vibrations of the tube assembly, namely, especially, also the aforementioned useful vibrations, the measuring transducer has a corresponding exciter assembly formed by means of two structurally identical, electrodynamic vibration exciters. Each of the vibration exciters respectively electrically connected to the aforementioned transformer circuit by means of a pair of electrical connecting lines, for example in the form of connecting wires and/or in the form of printed conductors of a flexible printed circuit board, serves, when actuated by a respective electric driver signal generated by the drive electronics unit provided in the transformer circuit and correspondingly conditioned, namely at least in each case adapted to changing vibration properties of the respective tube, specifically to convert an electric excitation power fed by means of said driver signal into driving forces acting on the respective tubes. The drive electronics unit is also specifically configured to adjust each of the driver signals by means of internal control such that it respectively has a signal frequency corresponding to the useful frequency to be respectively induced, occasionally also changed over time. Due to the aforementioned useful vibrations, not least also in the event that the useful vibrations are bending vibrations, Coriolis forces that are known to also depend on the instantaneous mass flow rate in the flowing medium are induced. These forces can in turn cause Coriolis vibrations that are dependent on the mass flow rate and respectively superimposed on the useful vibrations, at the useful frequency in such a way that, between inlet-side and outlet-side vibrational movements of each of the tubes carrying out the useful vibrations and being flowed through by fluid at the same time, a propagation time difference or phase difference can be detected, which is also dependent on the mass flow rate, i.e., can also be used as a measure for the mass flow measurement. In the case of a tube curved at least in sections, in which a vibration shape in which said tube is allowed to oscillate in the manner of a cantilever clamped at one end is selected for the useful vibrations, the resulting Coriolis vibrations correspond, for example, to the bending vibration mode, which is occasionally also referred to as twist mode, in which the tube respectively carries out rotational vibrations about an associated imaginary rotational vibration axis oriented perpendicularly to the mentioned imaginary vibration axis. Furthermore, the measuring transducer has a sensor assembly which serves to sense mechanical vibrations of the tube assembly, namely, especially, the aforementioned bending vibrations of the tubes, and to generate measurement signals respectively representing vibrational movements of one or more of the tubes and is formed by means of four structurally identical, electrodynamic vibration sensors.

The tubes of the aforementioned tube assemblies or of a measuring transducer respectively formed therewith respectively have at least one straight first partial segment connected to the first flow divider of the tube assembly, i.e., forming the first end of the tube, an arcuate second partial segment adjoining said first partial segment, a straight third partial segment adjoining said second partial segment, an arcuate fourth partial segment adjoining said third partial segment, a straight fifth partial segment adjoining said fourth partial segment, an arcuate sixth partial segment adjoining said fifth partial segment, and a straight seventh partial segment both adjoining said sixth partial segment and connected to the second flow divider of the tube assembly, i.e., forming the second end of the tube. The first and the seventh partial segments can, for example, be connected to the respective flow divider in a bonded manner by soldering or welding or in a force-fitting and/or positive-locking manner by pressing and/or rolling.

Each of the first and seventh partial segments, each of the second and sixth partial segments, and each of the third and fifth partial segments of the respective tube respectively form pairs of structurally identical partial segments. Moreover, all straight partial segments are respectively hollow cylindrical, wherein the first partial segments are both identical in shape and identical in size and wherein the seventh partial segment are both identical in shape and identical in size to one another and to the first partial segments in such a way that the segment lengths of each of the first and seventh partial segments of the first and second tubes is respectively equal to the segment length of each of the other of the first and seventh partial segments of the first and second tubes. The tubes are furthermore designed and arranged such that the first partial segments respectively run in parallel to one another, that the third partial segments respectively run in parallel to one another, that the fifth partial segments respectively run in parallel to one another, and that the seventh partial segments respectively run in parallel to one another.

Furthermore, the arcuate second, fourth, and sixth partial segments are respectively circular arc-shaped in such a way that each of the arcuate partial segments respectively has a segment length (arc length) corresponding to an extended length of an imaginary circular arc-shaped center line of said partial segment, an arc radius corresponding to a radius of said imaginary circular arc-shaped center line, and a center point angle corresponding to a ratio of said segment length to said arc radius. Moreover, the tubes are furthermore designed and arranged such that at least the second partial segments of the first and second tubes in projection onto the first plane of symmetry run in parallel to the second partial segments of the third and fourth tubes and at least the sixth partial segments of the first and second tubes in projection onto the first plane of symmetry run in parallel to the sixth partial segments of the third and fourth tubes.

In measuring transducers shown in US-A 2012/0192658 or US-A 2017/0261474, the two tubes belonging to a first pair of structurally identical tubes specifically respectively also have the same tube length as the other two tubes belonging to the respective other second pair of structurally identical tubes. For this purpose, the tubes are furthermore designed and arranged such that the fourth partial segments of the first and second tubes in projection onto the first plane of symmetry also run in parallel to the fourth partial segments of the third and fourth tubes. Moreover, the first and third tubes located in the aforementioned common first tube plane and the second and fourth tubes located in the common second tube plane are respectively rigidly coupled to one another by means of gusset plates. In contrast thereto, in measuring transducers shown in US-A 2017/0356777, the two tubes belonging to a first pair of structurally identical tubes respectively have a different tube length than the other two tubes belonging to the respective other, second pair of structurally identical tubes in such a way that the first and second tubes respectively have a greater tube length than the third and fourth tubes, wherein for this purpose, the segment length of each of the straight third and fifth partial segments of the first and second tubes is respectively greater than the segment length of each of the straight third and fifth partial segments of the third and fourth tubes. As a result thereof, such a tube assembly is formed by means of four tubes that inherently only in pairs have identical natural or resonant frequencies, i.e., two mechanical oscillators, namely, here, the first or second pair of structurally identical tubes, can intrinsically, namely already without additional gusset plates coupling structurally identical tubes in pairs, be provided with frequency spectra that deviate significantly from one another, namely have natural or resonant frequencies that deviate from one another at least in one basic bending vibration mode.

As inter alia also discussed in US-A 2012/0192658 or US-A 2017/0261474, a measuring accuracy to be achieved by means of a measuring system formed by means of such measuring transducers may, inter alia, also depend on the individual flow resistances of the four flow paths of the tube assembly formed by means of the tubes or on a degree to which one of the flow resistances respectively deviates from each of the other flow resistances. For example, US-A 2012/0192658 proposes designing the tubes of the tube assembly such that four parallel flow paths with respectively identical flow resistances are thereby provided, whereas US-A 2017/0356777 proposes forming the four tubes, i.e., the four parallel flow paths provided thereby, with flow resistances that deviate from one another, in such a way that, although two structurally identical tubes naturally respectively cause the same flow resistance, the one of the two aforementioned oscillators that, in the associated basic bending vibration mode, has the higher natural frequency in comparison to the other of the two oscillators, overall counteracts the flowing fluid partial flow resistance that is less in comparison to a partial flow resistance of the other of the two oscillators.

Further investigations into measuring transducers of the type discussed have moreover shown that in the case of measuring transducers formed by means of only pairs of structurally identical tubes, for example, according to US-A 2017/0356777 or US-A 2012/0192658, not only the aforementioned flow resistances themselves but moreover also a deviation between the first partial flow resistance formed overall by the first pair of structurally identical tubes and the second partial flow resistance formed overall by the second pair of structurally identical tubes may be influenced to a considerable extent by the flowing fluid itself, namely, especially, may depend on a Reynolds number (Re) of the fluid flowing in the process line; this specifically such that the aforementioned first partial flow resistance can deviate considerably from the aforementioned second partial flow resistance even in the case of a single-phase liquid with increasing Reynolds number, and concomitantly therewith, a first partial mass flow established by the first pair of structurally identical tubes may also deviate equally from a second partial mass flow established by the second pair of structurally identical tubes, wherein said relative deviation of the two partial flow resistances or of the two partial mass flows during operation of the respective measuring system may moreover be subject to considerable fluctuations.

SUMMARY

Based on the aforementioned prior art, one object of the invention is to improve tube assemblies of the type discussed or measuring transducers formed therewith to the effect that a deviation ($\Delta m$) between the aforementioned partial flow resistances of the flow paths formed by means of the tubes structurally identical only in pairs or a deviation between the first and second partial mass flows caused thereby is, on the one hand, as small as possible and, on the other hand, largely independent of the Reynolds number of the fluid flowing in the pipeline in such a way that for a fluid flowing in the process line with a Reynolds number between 2000 and 100000 (Re=2000-100000) and/or for a mass flow in the process line with a Reynolds number that changes with a fluctuation width ($\Delta$Re) of more than 20000 ($\Delta$Re=20000), a respective deviation between the first partial mass flow and the second partial mass flow is not more than 2% of the respective largest of the two partial mass flows. Moreover, the aforementioned deviations ($\Delta$m) between the first partial mass flow and the second partial mass flow should have, at least within the aforementioned Reynolds number ranges ($\Delta$Re), namely located between 2000 and 100000 and/or extending beyond 20000, at most a fluctuation width of a total of less than 1% of the largest of the two partial mass flows and/or of less than 50% of a maximum deviation between the two partial mass flows; this, especially, also with the design of the measuring transducer being still as compact as possible.

In order to achieve the object, the invention consists in a measuring transducer for a vibronic measuring system serving to measure at least one measured variable of a flowing fluid, said measuring transducer comprising:

a tube assembly with a curved first tube, which is, for example, at least in sections V-shaped and/or one-piece, with a curved second tube structurally identical to the first tube, with a curved third tube, which is, for example, at least in sections V-shaped and/or one-piece, with a curved fourth tube structurally identical only to the third tube, with a first flow divider serving, for example, as a line branching unit and/or located on the inlet side, with four flow openings, and with a second flow divider, for example, structurally identical to the first flow divider and/or serving as a line merging unit and/or located on the outlet side, with four flow openings;

an exciter assembly for inducing and maintaining mechanical vibrations of the tube assembly, namely, for example, bending vibrations of each of the first, second, third, and fourth tubes about a respective rest position; and a sensor assembly for sensing mechanical vibrations of the tube assembly, namely, for example, bending vibrations of each of the first, second, third, and fourth tubes about a respective rest position, and for generating vibration measurement signals respectively representing vibrational movements of one or more of the first, second, third, and fourth tubes. In the measuring transducer according to the invention, each of the first, second, third, and fourth tubes respectively extends from a respective first end of the respective tube to a respective second end of said tube in each case with a tube length corresponding to an extended length of an imaginary center line of said tube, and each of the first, second, third, and fourth tubes respectively has a tube wall, especially a metallic tube wall, and a lumen enclosed thereby. Each of the first, second, third, and fourth tubes is moreover respectively connected to each of the first and second flow dividers in such a way that the first tube opens with its first end into a first flow opening of the first flow divider and with its second end into a first flow opening of the second flow divider, the second tube opens with its first end into a second flow opening of the first flow divider and with its second end into a second flow opening of the second flow divider, the third tube opens with its first end into a third flow opening of the first flow divider and with its second end into a third flow opening of the second flow divider, and the fourth tube opens with its first end into a fourth flow opening of the first flow divider and with its second end into a fourth flow opening of the second flow divider. Each of the first, second, third, and fourth tubes of the measuring transducer according to the invention respectively has at least one straight first partial segment connected to the first flow divider, a circular arc-shaped second partial segment adjoining said first partial segment, a circular cylindrical third partial segment adjoining said second partial segment, a circular arc-shaped fourth partial segment adjoining said third partial segment, a straight fifth partial segment adjoining said fourth partial segment and both identical in shape and identical in size to the respective third partial segment, a circular arc-shaped sixth partial segment adjoining said fifth partial segment and both identical in shape and identical in size to the respective second partial segment, and a straight seventh partial segment both adjoining said sixth partial segment and connected to the second flow divider and both identical in shape and identical in size to the respective first partial segment, wherein each of the (straight) first, third, fifth, and seventh partial segments respectively has a segment length corresponding to a length of a respective imaginary longitudinal axis of said partial segment and each of the (circular arc-shaped) second, fourth, and sixth partial segments respectively has a segment length (arc length) corresponding to an extended length of an imaginary circular arc-shaped center line of said partial segment, an arc radius corresponding to a radius of said imaginary circular arc-shaped center line, and a center point angle corresponding to a ratio of said segment length to said arc radius. In addition, in the measuring transducer according to the invention, the second partial segments are both identical in shape and identical in size in such a way that the segment length, arc radius, and center point angle of each of the second partial segments are respectively equal to the segment length, arc radius, and center point angle, respectively, of each of the other of the second partial segments; and the sixth partial segments are both identical in shape and identical in size in such a way that the segment length, arc radius, and center point angle of each of the sixth partial segments are respectively equal to the segment length, arc radius, and center point angle, respectively, of each of the other of the sixth partial segments.

Furthermore, the invention also consists in a vibronic measuring system for measuring and/or monitoring at least one flow parameter, for example also a time-varying flow parameter, namely, for example, a mass flow rate, a volume flow rate, and/or a flow velocity, and/or for measuring and/or monitoring at least one substance parameter, for example a time-varying substance parameter, namely, for example, a density and/or a viscosity, of a flowing fluid, for example a gas, a liquid, or a dispersion, said measuring system comprising the measuring transducer according to the invention, and an electronic measuring and operating system (formed, for example, by means of at least one microprocessor and/or by means of at least one digital signal processor) which is electrically coupled to both the exciter assembly thereof and the sensor assembly thereof (for example by means of electrical connecting lines).

Moreover, the invention also consists in using the aforementioned measuring transducer or the aforementioned formed therewith for measuring and/or monitoring a fluid (for example, also a liquid flowing at a mass flow rate of more than 800 t/h) flowing in a pipeline (for example, having a nominal diameter of more than 100 mm).

According to a first embodiment of the invention, it is furthermore provided that the respective tube length of each of the first and second tubes is respectively greater than the tube length of each of the third and fourth tubes, namely, for example, respectively greater than 101% of the tube length of the third or fourth tube and/or respectively less than 105% of the tube length of the third or fourth tube.

According to a second embodiment of the invention, it is furthermore provided that the each of the first, third, fifth, and seventh partial segments is respectively hollow cylindrical.

According to a third embodiment of the invention, it is furthermore provided that the respective segment length of each of the first and seventh partial segments of the third and fourth tubes is respectively greater than the segment length of each of the first and seventh partial segments of the first and second tubes, namely, for example, respectively not less than 200% of the segment length of the first and seventh partial segments of the first and second tubes and/or respectively not more than 400% of the segment length of the first and seventh partial segments of the first and second tubes.

According to a fourth embodiment of the invention, it is furthermore provided that the first, second, third, and fourth tubes are designed and arranged such that the first partial segments or their longitudinal axes run in parallel to one another, and that the seventh partial segments or their longitudinal axes run in parallel to one another.

According to a fifth embodiment of the invention, it is furthermore provided that the first, second, third, and fourth tubes are designed and arranged such that the third partial segments or their longitudinal axes run in parallel to one another, and that the fifth partial segments or their longitudinal axes run in parallel to one another.

According to a sixth embodiment of the invention, it is furthermore provided that the first and seventh partial segments of the first and second tubes are both identical in shape and identical in size, and that the first and seventh partial segments of the third and fourth tubes are both identical in shape and identical in size.

According to a seventh embodiment of the invention, it is furthermore provided that the first and seventh partial segments of the third and fourth tubes are respectively greater than the first and seventh partial segments of the first and second tubes in such a way that the segment length of each of the first and seventh partial segments of the third and fourth tubes is respectively greater than the segment length of each of the first and seventh partial segments of the first and second tubes.

According to an eighth embodiment of the invention, it is furthermore provided that each of the first, second, third, and fourth tubes respectively has a caliber corresponding to a largest inner diameter of said tube, said caliber being not less than 20 mm, for example also more than 40 mm, and/or being equal to the caliber of each of the other of the first, second, third, or fourth tubes.

According to a ninth embodiment of the invention, it is furthermore provided that each of the first, second, third, and fourth tubes respectively has a caliber corresponding to a largest inner diameter of said tube, for example being not less than 20 mm, in such a way that the respective segment length of each of the first and seventh partial segments of the first and second tubes is not less than 20% of the caliber of the respective first or second tube.

According to a tenth embodiment of the invention, it is furthermore provided that each of the first, second, third, and fourth tubes respectively has a caliber corresponding to a largest inner diameter of said tube, for example being not less than 20 mm, in such a way that the respective segment length of each of the first and seventh partial segments of the third and fourth tubes is not less than 100% of the caliber of the respective third or fourth tube.

According to an eleventh embodiment of the invention, it is furthermore provided that each of the first, second, third, and fourth tubes respectively has a caliber corresponding to a largest inner diameter of said tube, for example being not less than 20 mm, in such a way that the respective segment length of each of the first and seventh partial segments of the first and second tubes is respectively not more than 100% of the caliber of the respective first or second tube.

According to a twelfth embodiment of the invention, it is furthermore provided that each of the first, second, third, and fourth tubes respectively has a caliber corresponding to a largest inner diameter of said tube, for example being not less than 20 mm, in such a way that the respective segment length of each of the first and seventh partial segments of the fourth and third tubes is respectively not more than 300% of the caliber of the respective third or fourth tube.

According to a thirteenth embodiment of the invention, it is furthermore provided that each of the first, second, third, and fourth tubes respectively has a caliber corresponding to a largest inner diameter of said tube, for example being not less than 20 mm, in such a way that the respective segment length of each of the second, third, fourth, fifth, and sixth partial segments is respectively not less than 150% of the caliber of the respective first, second, third, or fourth tube.

According to a fourteenth embodiment of the invention, it is furthermore provided that each of the first, second, third, and fourth tubes respectively has a caliber corresponding to a largest inner diameter of said tube, for example being not less than 20 mm, in such a way that the respective arc radius of each of the second, fourth, fifth, and sixth partial segments is respectively not less than 150% of the caliber of the respective first, second, third, or fourth tube.

According to a fifteenth embodiment of the invention, it is furthermore provided that each of the first, second, third, and fourth tubes respectively has a caliber corresponding to a largest inner diameter of said tube, for example being not less than 20 mm, in such a way that each of the first, second, third, and fourth tubes respectively has a tube length-to-caliber ratio, measured as a quotient of the respective tube length to the respective caliber, that is greater than 25 (25:1), namely, for example, less than 30 (30:1).

According to a sixteenth embodiment of the invention, it is furthermore provided that each of the first, second, third, and fourth tubes respectively has a caliber corresponding to a largest inner diameter of said tube, for example, being not less than 20 mm, in such a way that each of the first, third, fifth, and seventh partial segments respectively has a caliber that remains the same over their respective segment length.

According to a seventeenth embodiment of the invention, it is furthermore provided that the respective arc radius of each of the fourth partial segments of the first and second tubes is not less than 130% of the arc radius of the fourth partial segments of the third and fourth tubes.

According to an eighteenth embodiment of the invention, it is furthermore provided that the respective arc radius of each of the second, third, fourth, fifth, and sixth partial segments is respectively not less than 50 mm.

According to a nineteenth embodiment of the invention, it is furthermore provided that the respective arc radius of each of the fourth partial segments of the third and fourth tubes is equal to the arc radius of each of the second or sixth partial segments.

According to a twentieth embodiment of the invention, it is furthermore provided that the respective segment length of each of the fourth partial segments of the first and second tubes is not less than 130% of the segment length of the fourth partial segments of the third and fourth tubes.

According to a twenty-first embodiment of the invention, it is furthermore provided that the center point angle of each of the fourth partial segments is respectively equal to the center point angle of each of the other fourth partial segments.

According to a twenty-second embodiment of the invention, it is furthermore provided that the center point angle of each of the fourth partial segments is respectively greater than the center point angle of each of the second and sixth partial segments, namely, for example, in such a way that the center point angle of each of the fourth partial segments is respectively twice as large as the center point angle of each of the second and sixth partial segments.

According to a twenty-third embodiment of the invention, it is furthermore provided that the fourth partial segments of the first and second tubes are both identical in shape and identical in size in such a way that the segment length, arc radius, and center point angle of each of the fourth partial segments of the first and second tubes are respectively equal to the segment length, arc radius, and center point angle, respectively, of the respective other of the fourth partial segments of the first and second tubes, and that the fourth partial segments of the third and fourth tubes are both identical in shape and identical in size in such a way that the segment length, arc radius, and center point angle of each of the fourth partial segments of the third and fourth tubes are respectively equal to the segment length, arc radius, and center point angle, respectively, of the respective other of the fourth partial segments of the third and fourth tubes.

According to a twenty-fourth embodiment of the invention, it is furthermore provided that the fourth partial segments of the first and second tubes are respectively greater than the fourth partial segments of the third and fourth tubes in such a way that the segment length of each of the fourth partial segments of the first and second tubes is respectively greater than the segment length of each of the fourth partial segments of the third and fourth tubes, namely, for example, more than 130% and/or less than 200% of the segment length of each of the fourth partial segments of the third and fourth tubes.

According to a twenty-fifth embodiment of the invention, it is furthermore provided that the arc radius of each of the fourth partial segments of the first and second tubes is respectively greater than the arc radius of each of the fourth partial segments of the third and fourth tubes, namely, for example, 200% of the arc radius of each of the fourth partial segments of the third and fourth tubes.

According to a twenty-sixth embodiment of the invention, it is furthermore provided that the first, second, third, and fourth tubes are designed and arranged such that the fourth partial segments or the imaginary circular arc-shaped center line of the fourth partial segments in a projection onto the first plane of symmetry run in parallel to one another.

According to a twenty-seventh embodiment of the invention, it is furthermore provided that both a smallest wall thickness of the tube wall of the first tube and a smallest wall thickness of the tube wall of the second tube are respectively equal to a smallest wall thickness of the tube wall of the third tube and respectively equal to a smallest wall thickness of the tube wall of the fourth tube.

According to a twenty-eighth embodiment of the invention, it is furthermore provided that the tube wall of each of the first, second, third, and fourth tubes consists of the same material, namely, for example, a stainless steel or a nickel-based alloy in each case.

According to a twenty-ninth embodiment of the invention, it is furthermore provided that each of the first, second, third, and fourth tubes is respectively connected in a bonded manner both to the first flow divider and to the second flow divider.

According to a thirtieth embodiment of the invention, it is furthermore provided that the tube assembly has precisely four tubes, i.e., no further tube connected to the first flow divider and the second flow divider except for the first, second, third, and fourth tubes.

According to a thirty-first embodiment of the invention, the first, second, third, and fourth tubes are designed and arranged such that the tube assembly has a first plane of symmetry located both between the first and second tube and between the third and fourth tube, namely an imaginary reference plane with respect to which the tube assembly is mirror-symmetrical.

According to a thirty-second embodiment of the invention, the first, second, third, and fourth tubes are designed and arranged such that the tube assembly has a first plane of symmetry located both between the first and second tube and between the third and fourth tube, namely an imaginary reference plane with respect to which the tube assembly is mirror-symmetrical, in such a way that the first tube has a smallest distance from the first plane of symmetry of the tube assembly that is equal to a smallest distance that the third tube has from the first imaginary plane of symmetry of the tube assembly.

According to a thirty-third embodiment of the invention, the first, second, third, and fourth tubes are designed and arranged such that the tube assembly has a first plane of symmetry located both between the first and second tube and between the third and fourth tube, namely an imaginary reference plane with respect to which the tube assembly is mirror-symmetrical, in such a way that the second tube has a smallest distance from the first plane of symmetry of the tube assembly that is equal to a smallest distance that the fourth tube has from the first imaginary plane of symmetry of the tube assembly.

According to a thirty-fourth embodiment of the invention, the first, second, third, and fourth tubes are designed and arranged such that the tube assembly has a first plane of symmetry located both between the first and second tube and between the third and fourth tube, namely an imaginary reference plane with respect to which the tube assembly is mirror-symmetrical, in such a way that each of the first, second, third, and fourth tubes is parallel to the first plane of symmetry of the tube assembly.

According to a thirty-fifth embodiment of the invention, the first, second, third, and fourth tubes are designed and arranged such that the tube assembly has a first plane of symmetry located both between the first and second tube and between the third and fourth tube, namely an imaginary reference plane with respect to which the tube assembly is mirror-symmetrical, in such a way that the tube assembly has a second plane of symmetry of the tube assembly which is perpendicular to the first plane of symmetry of the tube assembly but nevertheless imaginarily intersects each of the first, second, third, and fourth tubes, namely, for example, their respective fourth partial segment, and is mirror-symmetrical with respect to said second plane of symmetry of the tube assembly.

According to a thirty-sixth embodiment of the invention, it is furthermore provided that each of the first, second, third, and fourth tubes respectively has a first plane of symmetry and a second plane of symmetry perpendicular thereto, and wherein each of the first, second, third, and fourth tubes is respectively mirror-symmetrical both to the associated first plane of symmetry and to the associated second plane of symmetry.

According to a thirty-seventh embodiment of the invention, the tube assembly has a first imaginary connection axis which imaginarily connects a center point of the first flow opening of the first flow divider and a center point of the first flow opening of the second flow divider to one another, a second imaginary connection axis which imaginarily connects a center point of the second flow opening of the first flow divider and a center point of the second flow opening of the second flow divider to one another, a third imaginary connection axis which imaginarily connects a center point of the third flow opening of the first flow divider and a center point of the third flow opening of the second flow divider to one another, and a fourth imaginary connection axis which imaginarily connects a center point of the fourth flow opening of the first flow divider and a center point of the fourth flow opening of the second flow divider to one another in such a way that each imaginary connection axis respectively runs in parallel to each other of said connection axes.

A thirty-eighth embodiment of the invention provides that the tube assembly has a first imaginary connection axis which imaginarily connects a center point of the first flow opening of the first flow divider and a center point of the first flow opening of the second flow divider to one another, a second imaginary connection axis which imaginarily connects a center point of the second flow opening of the first flow divider and a center point of the second flow opening of the second flow divider to one another, a third imaginary connection axis which imaginarily connects a center point of the third flow opening of the first flow divider and a center point of the third flow opening of the second flow divider to one another, and a fourth imaginary connection axis which imaginarily connects a center point of the fourth flow opening of the first flow divider and a center point of the fourth flow opening of the second flow divider to one another, and that each of the tubes respectively has a tube arc height, measured as a (greatest) distance of an apex of the respective fourth partial segment from the associated imaginary connection axis, namely the one imaginarily connecting the respective first and second end of the respective tube, wherein the tube arc height is selected such that each of the tubes respectively has a tube length-to-tube arc height ratio, measured as a quotient of the tube length of the respective tube to the respective tube arc height, that is greater than 2 (2:1), namely, for example, greater than 2.5 (2.5:1), and less than 5 (5:1), namely, for example, less than 3 (3:1), and/or that each of the tubes respectively has a caliber-to-tube arc height ratio, measured as a quotient of the caliber of the respective tube to the respective tube arc height, that is greater than 0.1, namely, for example, less than 0.2.

A thirty-ninth embodiment of the invention provides that the tube assembly has a first imaginary connection axis which imaginarily connects a center point of the first flow opening of the first flow divider and a center point of the first flow opening of the second flow divider to one another, a second imaginary connection axis which imaginarily connects a center point of the second flow opening of the first flow divider and a center point of the second flow opening of the second flow divider to one another, a third imaginary connection axis which imaginarily connects a center point of the third flow opening of the first flow divider and a center point of the third flow opening of the second flow divider to one another, and a fourth imaginary connection axis which imaginarily connects a center point of the fourth flow opening of the first flow divider and a center point of the fourth flow opening of the second flow divider to one another, and that the first, second, third, and fourth tubes are designed and arranged such that each of the first partial segments is respectively aligned with the associated imaginary connection axis, namely the one imaginarily connecting the respective first and second end of the respective tube, for example in such a way that the imaginary longitudinal axis of each of the first partial segments respectively coincides with the associated imaginary connection axis.

A fortieth embodiment of the invention provides that the tube assembly has a first imaginary connection axis which imaginarily connects a center point of the first flow opening of the first flow divider and a center point of the first flow opening of the second flow divider to one another, a second imaginary connection axis which imaginarily connects a center point of the second flow opening of the first flow divider and a center point of the second flow opening of the second flow divider to one another, a third imaginary connection axis which imaginarily connects a center point of the third flow opening of the first flow divider and a center point of the third flow opening of the second flow divider to one another, and a fourth imaginary connection axis which imaginarily connects a center point of the fourth flow opening of the first flow divider and a center point of the fourth flow opening of the second flow divider to one another, and that the first, second, third, and fourth tubes are designed and arranged such that each of the seventh partial segments is respectively aligned with the associated imaginary connection axis, namely the one imaginarily connecting the respective first and second end of the respective tube, for example in such a way that the imaginary longitudinal axis of each of the seventh partial segments respectively coincides with the associated imaginary connection axis.

According to a forty-first embodiment of the invention, it is furthermore provided that each of the first, second, third, and fourth tubes is respectively configured to conduct fluid in its respective lumens, namely, for example, to be flowed through by fluid starting from its respective first end in the direction of its respective second end, and meanwhile to be allowed to vibrate.

According to a forty-second embodiment of the invention, it is furthermore provided that the sensor assembly has a first vibration sensor (which is, for example, electrodynamic), a second vibration sensor (which is, for example, electrodynamic and/or structurally identical to the first vibration sensor), a third vibration sensor (which is, for example, electrodynamic and/or structurally identical to the first vibration sensor), and at least one fourth vibration sensor (which is, for example, electrodynamic and/or structurally identical to the third vibration sensor). Developing this embodiment of the invention further, it is furthermore provided that the first vibration sensor is attached to the third partial segment of the first tube at a distance from both the second partial segment of the first tube and the fourth partial segment of the first tube and to the third partial segment of the second tube at a distance from both the second partial segment of the second tube and the fourth partial segment of the second tube; that the second vibration sensor is attached to the fifth partial segment of the first tube at a distance from both the sixth partial segment of the first tube and the fourth partial segment of the first tube and to the fifth partial segment of the second tube at a distance from both the sixth partial segment of the second tube and the fourth partial segment of the second tube; that the third vibration sensor is attached to the third partial segment of the third tube at a distance from both the second partial segment of the third tube and the fourth partial segment of the third tube and to the third partial segment of the fourth tube at a distance from both the second partial segment of the fourth tube and the fourth partial segment of the fourth tube; and that the fourth vibration sensor is attached to the fifth partial segment of the third tube at a distance from both the sixth partial segment of the third tube and the fourth partial segment of the third tube and to the fifth partial segment of the fourth tube at a distance from both the sixth partial segment of the fourth tube and the fourth partial segment of the fourth tube. Alternatively or additionally, the first vibration sensor and the second vibration sensor can be spaced both respectively at the same distance from the fourth partial segment of the first tube and respectively at the same distance from the fourth partial segment of the second tube, and/or the third vibration sensor and the fourth vibration sensor can be spaced both respectively at the same distance from the fourth partial segment of the third tube and respectively at the same distance from the fourth partial segment of the fourth tube.

According to a forty-third embodiment of the invention, it is furthermore provided that wherein the exciter assembly has a first vibration exciter, which is, for example electrodynamic, and at least one second vibration exciter, which is, for example, electrodynamic and/or structurally identical to the first vibration exciter. Developing this embodiment of the invention further, it is furthermore provided that the first vibration exciter is attached to the fourth partial segment of the first tube at a distance from both the third partial segment of the first tube and the fifth partial segment of the first tube and to the fourth partial segment of the second tube at a distance from both the third partial segment of the second tube and the fifth partial segment of the second tube, and that the second vibration exciter is attached to the fourth partial segment of the third tube at a distance from both the third partial segment of the third tube and the fifth partial segment of the third tube and to the fourth partial segment of the fourth tube at a distance from both the third partial segment of the fourth tube and the fifth partial segment of the fourth tube. For example, the first vibration exciter can be spaced respectively at the same distance both from the third partial segment of the first tube and the fifth partial segment of the first tube and from the third partial segment of the second tube and the fifth partial segment of the second tube, and/or the second vibration exciter can be spaced respectively at the same distance both from the third partial segment of the third tube and the fifth partial segment of the third tube and from the third partial segment of the fourth tube and the fifth partial segment of the fourth tube.

According to a forty-fourth embodiment of the invention, it is furthermore provided that the first flow divider has a first connecting flange (serving, for example, to connect the tube assembly to a line segment of a process line supplying the fluid), and that the second flow divider has a second connecting flange (serving, for example, to connect the tube assembly to a line segment of a process line discharging the fluid again). Developing this embodiment of the invention further, it is furthermore provided that each of the connecting flanges respectively has a sealing surface for fluid-tight or leak-free connection of the tube assembly to a respectively corresponding line segment of a process line. Each sealing surface of each of the first and second connecting flanges can respectively have a smallest diameter (for example, also a diameter of more than 100 mm and/or a diameter defining a nominal diameter of the measuring transducer), or a smallest distance between the sealing surfaces of the first and second connecting flanges can define an installation length (for example, an installation length of more than 1000 mm and/or of less than 3000 mm) of the tube assembly or of the measuring transducer formed therewith.

According to an embodiment of the development of the invention, the measuring transducer furthermore comprises a transducer housing encasing the first, second, third, and fourth tubes, and it is moreover provided that the transducer housing has at least one cavity (which is, for example, also hermetically closed) and that each of the first, second, third, and fourth tubes is arranged within said cavity.

According to a first embodiment of the development of the invention, it is furthermore provided that the transducer housing has a compressive strength of more than 50 bar.

According to a second embodiment of the development of the invention, it is furthermore provided that the transducer housing has a compressive strength that is greater than a greatest compressive strength of the first, second, third, and fourth tubes.

According to a third embodiment of the development of the invention, it is furthermore provided that each of the first, second, third, and fourth tubes respectively has a smallest distance from the transducer housing, which smallest distance is greater than 5 mm and/or less than 10 mm.

According to a fourth embodiment of the development of the invention, it is furthermore provided that the transducer housing has a support element (which is, for example, cylindrical and/or tubular and/or at least in sections hollow cylindrical) extending from a first end to a second end with a support element length, wherein the support element is mechanically connected (namely, for example, bonded) at its first end to the first flow divider and to at its second end to the second flow divider.

According to a fifth embodiment of the development of the invention, it is furthermore provided that the transducer housing has a support element (which is, for example, cylindrical and/or tubular and/or at least in sections hollow cylindrical) extending from a first end to a second end with a support element length, wherein the support element is mechanically connected (namely, for example, bonded) at its first end to the first flow divider and to at its second end to the second flow divider, and wherein the support element has at least one hollow space encased by a wall, for example a metallic wall, and forming a partial region of the cavity. The wall of the support element can consist, for example, of a steel, namely a stainless steel or a structural steel, and/or of the same material as the tube wall of each of the first, second, third, and fourth tubes.

According to a sixth embodiment of the development of the invention, it is furthermore provided that the transducer housing has a support element (which is, for example, cylindrical and/or tubular and/or at least in sections hollow cylindrical) extending from a first end to a second end with a support element length, wherein the support element is mechanically connected (namely, for example, bonded) at its first end to the first flow divider and to at its second end to the second flow divider, and wherein the support element has at least one hollow space encased by a wall, for example a metallic wall, and forming a partial region of the cavity, wherein each of the first, second, third, and fourth tubes is arranged only partially within the hollow space of the support element; this, for example, also in such a way that each of the second partial segments of each of the first, second, third, and fourth tubes is arranged at least predominantly within the hollow space of the support element, and/or and that each of the sixth partial segments of each of the first, second, third, and fourth tubes is arranged at least predominantly within the hollow space of the support element, and/or that each of the third and fifth partial segments of each of the first, second, third, and fourth tubes is arranged at least predominantly outside the hollow space of the support element.

A seventh embodiment of the development of the invention provides that the transducer housing has a support element (which is, for example, cylindrical and/or tubular and/or at least in sections hollow cylindrical) extending from a first end to a second end with a support element length, wherein the support element is mechanically connected (namely, for example, bonded) at its first end to the first flow divider and to at its second end to the second flow divider, and wherein the support element has at least one hollow space encased by a wall, for example a metallic wall, and forming a partial region of the cavity, wherein each of the first, second, third, and fourth tubes is arranged only partially within the hollow space of the support element, and furthermore provides that the wall of the support element has a first opening and at least one second opening spaced apart from the first opening along an imaginary envelope line of the wall, wherein each of the first and second openings respectively forms a partial region of the cavity of the transducer housing, and wherein each of the first, second, third, and fourth tubes respectively extends both through the first opening and through the second opening; this, for example, also in such a way that both within the first opening and within the second opening, a respective smallest distance between the first tube and the third tube is respectively less than the smallest distance between the fourth partial segment of the first tube and the fourth partial segment of the third tube, and/or that both within the first opening and within the second opening, a respective smallest distance between the second tube and the fourth tube is respectively less than the smallest distance between the fourth partial segment of the second tube and the fourth partial segment of the fourth tube, and/or that each of the first, second, third, and fourth tubes respectively has a smallest distance from an edge of the first opening, and each of the smallest distances edge of the first opening is greater than 5 mm and/or less than 10 mm, and/or that each of the first, second, third, and fourth tubes respectively has a smallest distance from an edge of the second opening, and each of the smallest distances from the edge of the second opening is greater than 5 mm and/or less than 10 mm.

According to an eighth embodiment of the development of the invention, it is furthermore provided that the transducer housing has a support element (for example, also one of the aforementioned support elements) (which is, for example, cylindrical and/or tubular and/or at least in sections hollow cylindrical) extending from a first end to a second end with a support element length, and a casing element (which is, for example, cap-shaped or tubular), wherein the support element is mechanically connected (namely, for example, bonded) at its first end to the first flow divider and to at its second end to the second flow divider, and wherein the casing element is mechanically connected (namely, for example, bonded) to the support element.

A ninth embodiment of the development of the invention provides that the transducer housing has a support element (for example, also one of the aforementioned support elements) (which is, for example, cylindrical and/or tubular and/or at least in sections hollow cylindrical) extending from a first end to a second end with a support element length, and a casing element (which is, for example, cap-shaped or tubular), wherein the support element is mechanically connected (namely, for example, bonded) at its first end to the first flow divider and to at its second end to the second flow divider, and wherein the casing element is mechanically connected (namely, for example, bonded) to the support element, and furthermore provides that the casing element has a hollow space encased by a wall (for example, a metallic wall) and forming a partial region of the cavity, and that each of the first, second, third, and fourth tubes is arranged only partially within the hollow space of the casing element; this, for example, also in such a way that each of the fourth partial segments of each of the first, second, third, and fourth tubes is arranged exclusively within the hollow space of the casing element, and/or and that each of the third and fifth partial segments of each of the first, second, third, and fourth tubes is arranged at least predominantly within the hollow space of the casing element, and/or that each of the second and sixth partial segments of each of the first, second, third, and fourth tubes is arranged at least predominantly outside the hollow space of the casing element.

A tenth embodiment of the development of the invention provides that the transducer housing has a support element (for example, also one of the aforementioned support elements) (which is, for example, cylindrical and/or tubular and/or at least in sections hollow cylindrical) extending from a first end to a second end with a support element length, and a casing element (which is, for example, cap-shaped or tubular), wherein the support element is mechanically connected (namely, for example, bonded) at its first end to the first flow divider and to at its second end to the second flow divider, and wherein the casing element is mechanically connected (namely, for example, bonded) to the support element, and furthermore provides that the casing element has a hollow space encased by a wall (for example, a metallic wall) and forming a partial region of the cavity, and that each of the first, second, third, and fourth tubes is arranged only partially within the hollow space of the casing element, wherein a wall of the casing element together with a segment of the wall of the support element encases a hollow space forming a partial region of the cavity, and wherein each of the first, second, third, and fourth tubes is arranged only partially within the hollow space of the casing element; this, for example, also in such a way that each of the fourth partial segments of each of the first, second, third, and fourth tubes is arranged exclusively within said hollow space, and/or that each of the third and fifth partial segments of each of the first, second, third, and fourth tubes is arranged at least predominantly within the hollow space, and/or that each of the second and sixth partial segments of each of the first, second, third, and fourth tubes is arranged at least predominantly outside the hollow space.

A core idea of the invention consists in minimizing the aforementioned deviation of the first and second partial mass flows through the measuring transducer, which not least also impairs the measuring accuracy of conventional vibronic measuring systems of the type mentioned at the outset and which is concomitant with the deviation between the first and second partial flow resistances, or its dependence on the Reynolds number of the fluid flowing in the pipeline in that both the second partial segments and the sixth partial segments of all four tubes are both identical in shape and identical in size, as a result of which the radial or centrifugal accelerations respectively acting in the partial mass flows on the input side or on the output side are substantially the same. Concomitantly therewith, the flow profiles of the partial mass flows can also be formed more uniformly than was previously the case in conventional tube assemblies with four bent tubes or vibronic measuring transducers formed therewith (cf. FIG. 10).

An advantage of the invention furthermore consists in that the aforementioned second and sixth partial segments, i.e., eight of a total of twelve circular arc-shaped partial segments of the four tubes, are structurally identical, namely, they have both the same segment lengths and the same arc radii and center point angles, as a result of which the production of the four tubes can be considerably simplified and the production costs of the respective tube assembly can ultimately be correspondingly reduced. A further advantage can furthermore be seen in that the tube assembly can certainly also be formed by means of conventional flow dividers in that slight deviations, necessarily caused by the use of the eight structurally identical, circular arc-shaped partial segments, of the distances of said circular arc-shaped partial segments from the respectively closest first or second flow divider are compensated by correspondingly adapted segment lengths of the straight first partial segments adjoining the circular arc-shaped second partial segments or the straight seventh partial segments adjoining the circular arc-shaped sixth partial segments.

The invention as well as advantageous embodiments thereof are explained in more detail below based on exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, for example also combinations of partial aspects of the invention that were initially explained only separately, furthermore result from the figures of the drawing and/or from the claims themselves.

BRIEF DESCRIPTION OF THE DRAWINGS

The figures show in detail:

FIGS. 8, 9A and 9B show, respectively, a top view, and end view a cross-sectional, end view of the tube assembly according to FIGS. 7A and 7B.

DETAILED DESCRIPTION

Figure 1:
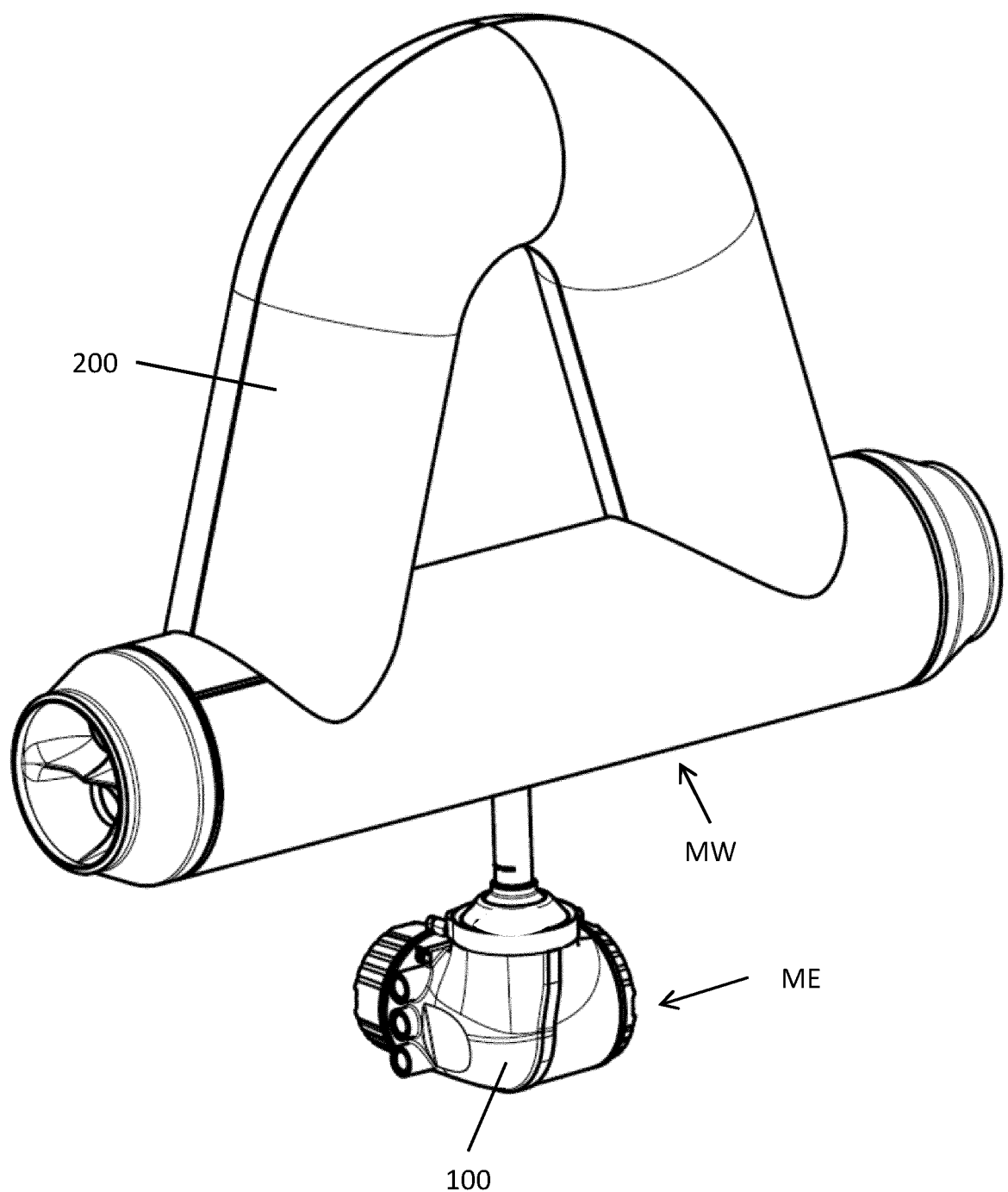
FIGS. 1, 2A, and 2B show, respectively, a perspective view, a side view and an end view of a vibronic measuring system.
Figure 2B:
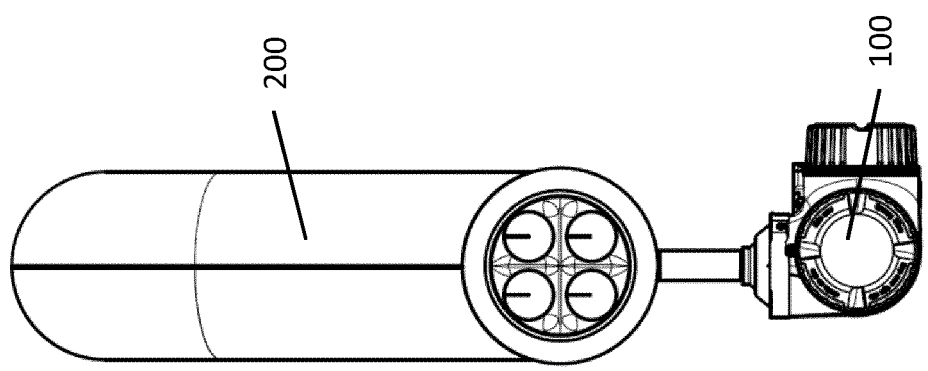
Figure 2A:
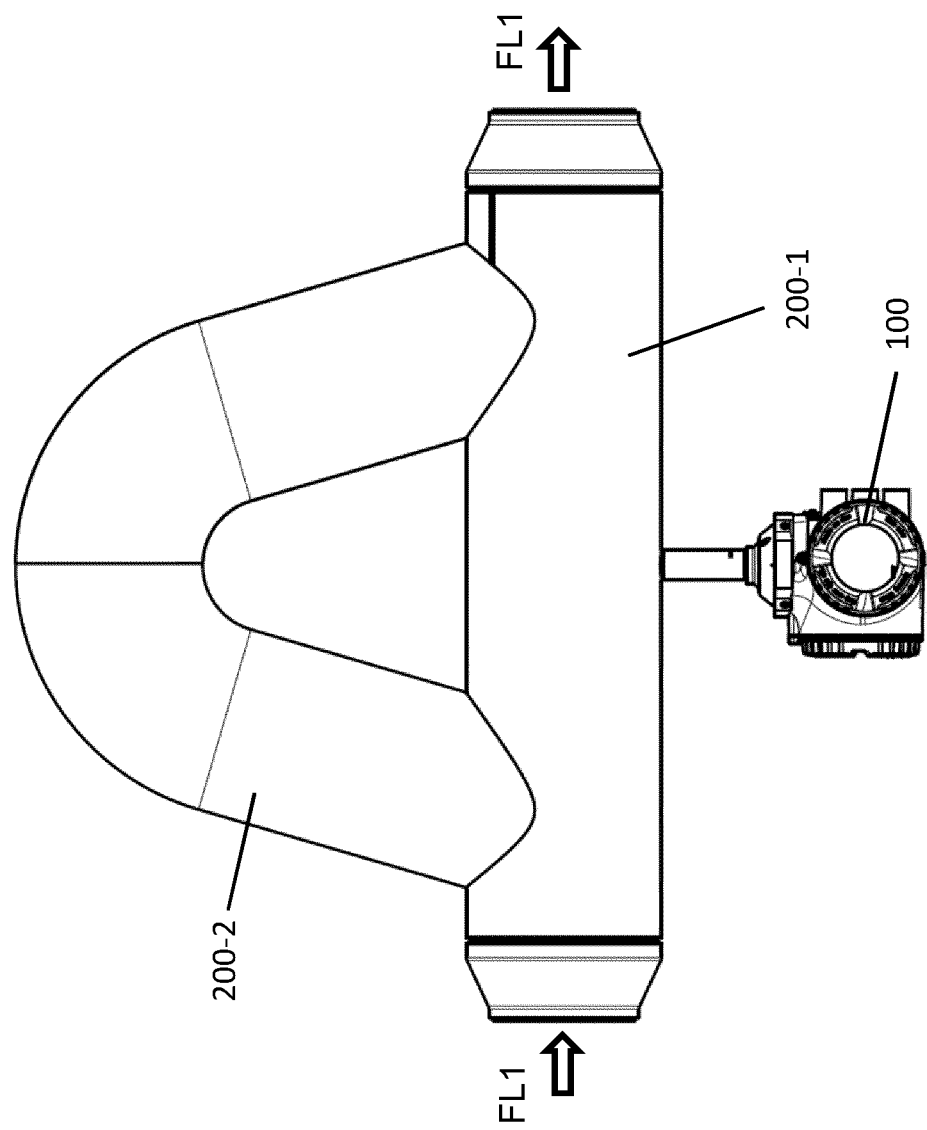

FIGS. 1, 2A, and 2B, or 4, 5A, and 5B schematically show exemplary embodiments or design variants of a vibronic measuring system serving to measure and/or monitor at least one, for example time-varying, flow parameter, for example a mass flow rate, a volume flow rate, and/or a flow velocity, and/or to measure and/or monitor at least one, for example time-varying, substance parameter, for example a density and/or a viscosity, of a fluid FL1 flowing at least temporarily. The measuring system is specifically provided or configured to be integrated into the course of a process line conducting the fluid FL1 serving as a measured substance, namely, for example, a gas, a liquid, or a dispersion, and/or designed as a pipeline, and to be at least temporarily flowed through during operation by the fluid FL1 supplied or discharged via the process line.

As readily apparent in FIGS. 3A, 3B, 6A, and 6B or from a combination of FIGS. 1, 2A, 2B, 3A, and 3B, or 4, 5A, 5B, 6A, and 6B, the measuring system comprises a measuring transducer MW with a tube assembly formed by means of four tubes (111, 121, 112, 122), which are structurally identical only in pairs and have, for example, flow resistances deviating from one another in order to provide parallel flow paths, and two flow dividers (21, 22) respectively connected thereto; an exciter assembly (31, 32) for inducing and maintaining mechanical vibrations of the tube assembly, not least of its tubes; and a sensor assembly (41, 42, 43, 44) for sensing mechanical vibrations of the tube assembly, namely, for example, mechanical vibrations of the tubes. Moreover, a temperature measuring assembly serving to detect temperatures within the tube assembly and/or a strain measuring assembly serving to detect mechanical stresses within the tube assembly can, for example, also be provided in the measuring transducer.

The tube assembly of the measuring transducer according to the invention or of the measuring system formed therewith is again shown in FIG. 7A, 7B, 8, 9A, or 9B and has a curved first tube 111, a curved second tube 121 structurally identical to said tube 111, a curved third tube 112, and a fourth tube 122 structurally identical only to said tube 112, i.e., neither to the tube 111 nor the tube 121. In addition, the tube assembly has a first flow divider 21 with four flow openings 21-1, 21-2, 21-3, 21-4 and a second flow divider 22 structurally identical, for example, to said flow divider 21, with likewise four flow openings 22-1, 22-2, 22-3, 22-4. Each of the tubes 111, 112, 121, 122 respectively extends from a respective first end of the respective tube to a respective second end of said tube with a respective tube length and respectively has a lumen enclosed by a tube wall, for example a metallic tube wall, and extending respectively from the respective first end of the respective tube to the respective second end of said tube. In addition, each of the tubes 111, 112, 121, 122, as respectively also shown in FIGS. 3A and 3B or 6A and 6B or readily apparent from a combination of FIGS. 2A, 2B, 3A, 3B, 7A, 7B, and 8, or 5A, 5B, 6A, 6B, 7A, 7B, and 8, is respectively connected to each of the two flow dividers 21, 22, namely, for example, connected thereto in a bonded, force-fitting, and/or positive-locking manner, in such a way that the tube 111 opens with its first end into a first flow opening 21-1 of the flow divider 21 and with its second end into a first flow opening 22-1 of the flow divider 22, the tube 121 opens with its first end into a second flow opening 21-2 of the flow divider 21 and with its second end into a second flow opening 22-2 of the flow divider 22, the tube 112 opens with its first end into a third flow opening 21-3 of the flow divider 21 and with its second end into a third flow opening 22-3 of the flow divider 22, and the tube 122 opens with its first end into a fourth flow opening 21-4 of the flow divider 21 and with its second end into a fourth flow opening 22-4 of the flow divider 22.

Ultimately, four fluidically parallel flow paths are thus formed in such a way that the fluid flowing into the measuring transducer is divided into four partial flows or a mass flow entering the measuring transducer is correspondingly divided into four partial mass flows, and that said partial flows are brought together again when flowing out of the measuring transducer or the partial mass flows are recombined into a single exiting mass flow. As apparent from the combination of FIGS. 2A, 2B, 3A, 3B, 7A, 7B, and 8, or 5A, 5B, 6A, 6B, 7A, 7B, and 8, the flow divider 21 can be arranged on the inlet side in the flow direction of the fluid FL1 or serve as a line branching unit, and the flow divider 22 can correspondingly be arranged on the outlet side in the flow direction of the fluid FL1 or serve as a line merging unit. According to a further embodiment of the invention, it is furthermore provided that the tube assembly has precisely four tubes, i.e., no further tube connected to the flow divider 21 and the flow divider 22 except for the aforementioned tubes 111, 112, 121, 122. The aforementioned tube length corresponds here to an extended length or a length of an imaginary center line of the respective tube, wherein the tube length of the tube 111 is equal to the tube length of the tube 121 or the tube length of the tube 121 is equal to the tube length of the tube 122. According to a further embodiment of the invention, the tube length of the tube 111 is moreover only equal to the tube length of the tube 121 but nevertheless greater than the tube length of both the tube 121 and the tube 122, or the tube length of the tube 121 is only equal to the tube length of the tube 122 but nevertheless less than the tube length of both the tube 111 and the tube 112. According to a further embodiment of the invention, the respective tube length of each of the first and second tubes 111, 121 is respectively greater than the tube length of each of the third and fourth tubes 112, 122; this specifically in such a way that the tube length of each of the tubes 111, 121 is respectively more than 101% of the tube length and/or respectively less than 105% of the tube length of the tube 112 or 122.

The tube wall of each of the tubes 111, 121, 112, 122 of the tube assembly respectively has a predetermined, for example also substantially uniform, wall thickness and can, as quite common in tube assemblies of the discussed type or measuring transducers or measuring systems formed therewith, consist, for example, of the same material and/or a metal, namely, for example, respectively a stainless steel or respectively a nickel-based alloy. The tubes 111, 121, 112, 122 can moreover respectively be formed, for example, in one piece, namely, for example, be produced seamlessly or at least in the case of a tube wall made of metal with a welded seam, and/or can respectively be formed by bending a tubular semi-finished product, for example in such a way that each of the tubes 111, 121, 112, 122, as also respectively indicated in FIGS. 2A, 2B, 3A, and 3B, or 5A, 5B, 6A, and 6B, is substantially V-shaped or has a V-shaped silhouette, and/or that each of the tubes ultimately has a tube shape lying in a single (bending) plane. According to a further embodiment of the invention, each of the tubes respectively has a caliber, namely an inner diameter, that is not less than 20 mm, for example also more than 40 mm and/or that is equal to the caliber of each of the other of the tubes. Since the two tubes 111, 121 and the two tubes 121, 122 are respectively structurally identical, the aforementioned caliber of the tube 111 is equal to the caliber of the tube 121 and the caliber of the tube 121 is equal to the caliber of the tube 122. According to a further embodiment of the invention, the caliber of each of the tubes 111, 112, 121, 122 is moreover equal to the caliber of each other of the tubes 111, 112, 121, or 122 and/or each of the tubes 111, 121, 112, 122 furthermore respectively has a tube length-to-caliber ratio, measured as a quotient of the respective tube length to the respective caliber, that is greater than 25 (25:1) but, for example, also less than 30(30:1). According to a further embodiment of the invention, the tube wall of each of the tubes respectively has a smallest wall thickness that is not less than 1 mm, for example also more than 1.5 mm, and/or that is equal to the smallest wall thickness of the tube wall of each of the other of the tubes. In that the two tubes 111, 121 and the two tubes 121, 122 are respectively structurally identical, the aforementioned smallest wall thickness of the tube wall of the tube 111 is equal to the smallest wall thickness of the tube wall of the tube 121 and the smallest wall thickness of the tube wall of the tube 121 is equal to the smallest wall thickness of the tube wall of the tube 122. According to a further embodiment of the invention, the aforementioned wall thickness tube wall of each of the tubes 111, 112, 121, 122 is moreover equal to the smallest wall thickness of the tube wall of each other of the tubes 111, 112, 121, or 122.

For connecting the tube assembly or the measuring transducer or measuring system formed therewith to the aforementioned process line conducting the fluid FL1, the flow divider 21 can have a first connecting flange, for example serving to connect the tube assembly to a line segment of said process line supplying the fluid FL1 during operation, and the flow divider 22 can have a second connecting flange, for example serving to connect the tube assembly to a line segment of the process line discharging the fluid FL1 again. On each of the aforementioned connecting flanges, a sealing surface for fluid-tight or leak-free connection of the tube assembly to the respectively corresponding line segment of the process line can, for example, be respectively formed. Each of the two sealing surfaces can respectively have a smallest diameter defining a nominal diameter of the measuring transducer that is more than 100 mm, and/or have a smallest distance, here defining an installation length of the tube assembly or of the measuring transducer formed therewith, from the respective other of the sealing surfaces that is more than 1000 mm and/or less than 3000 mm.

Figure 7A:
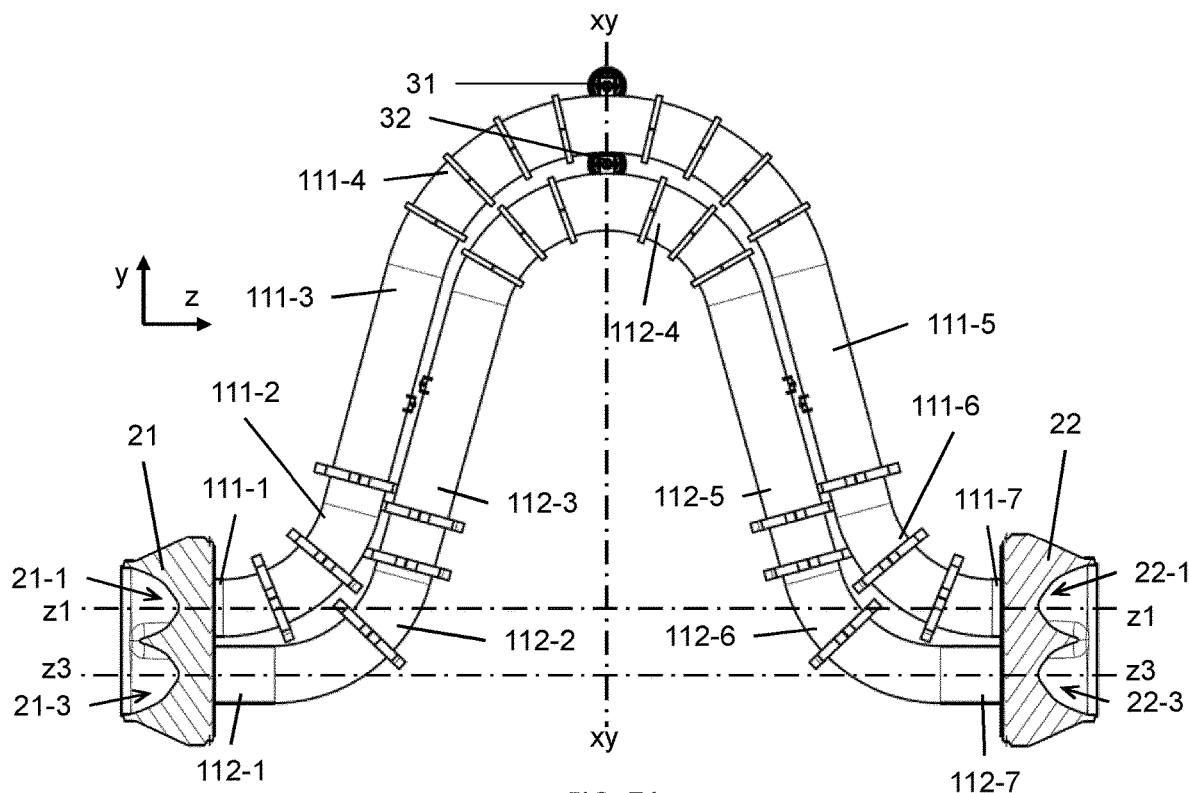
FIGS. 7A and 7B show side views of a tube assembly of a measuring transducer according to FIGS. 3A and 3B or according to FIGS. 6A and 6B.
Figure 7B:
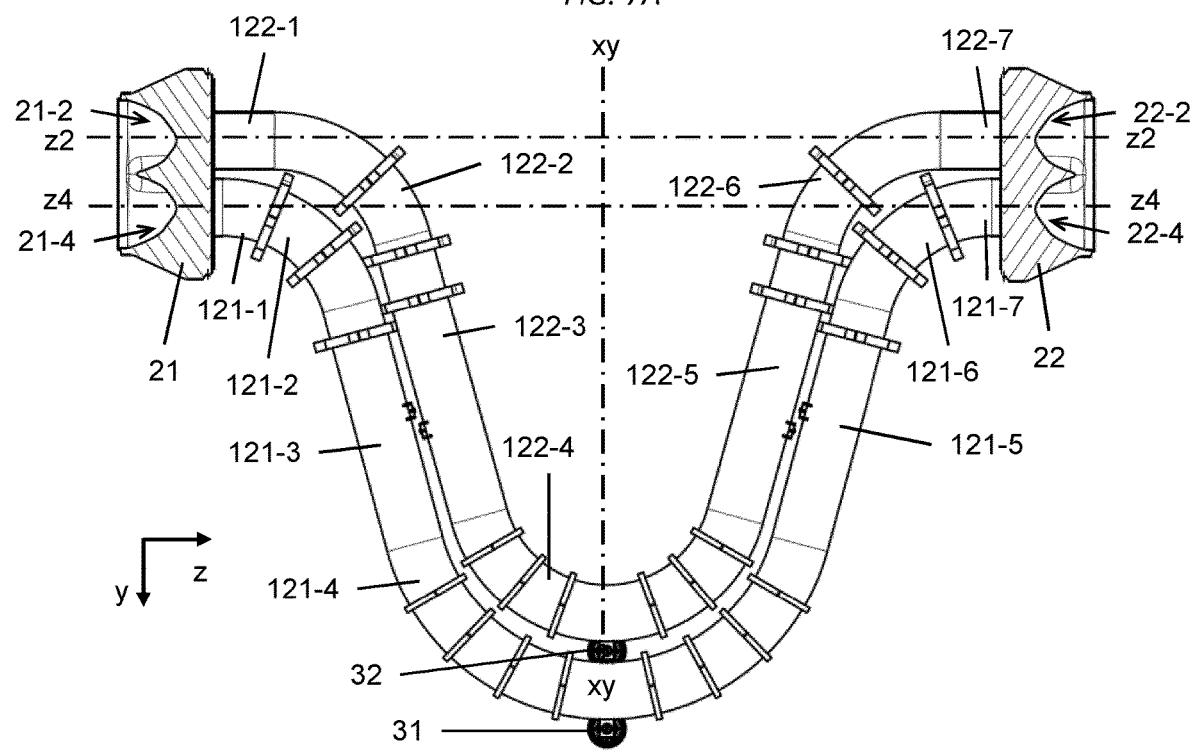
Figure 8:
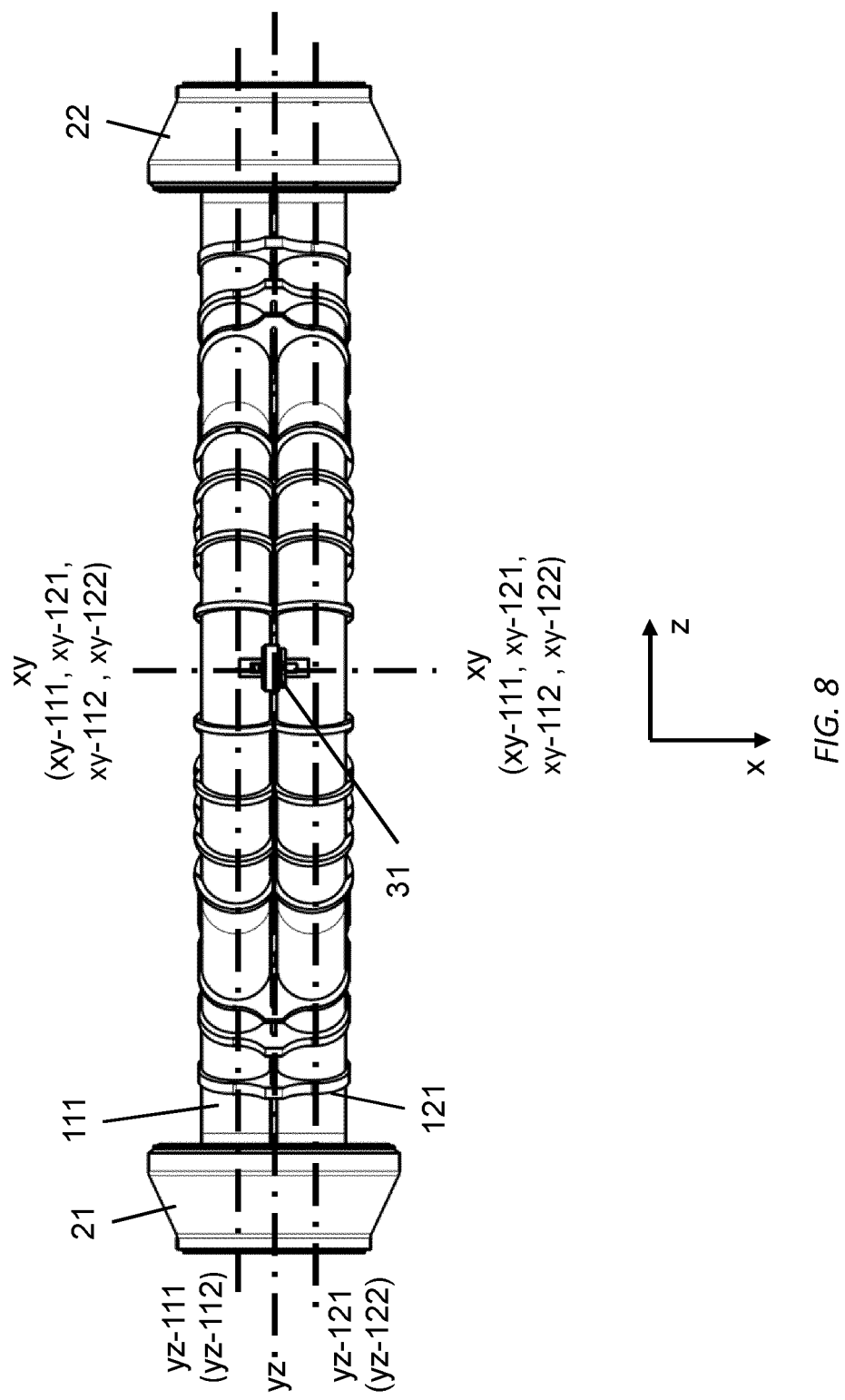

According to a further embodiment of the invention, the tubes 111, 121, 112, 122 and the flow dividers 21, 22 are furthermore designed and arranged such that the tube assembly, as also schematically shown in FIG. 7A or 7B, has a first imaginary connection axis z1 which imaginarily connects a center point of the flow opening 21-1 and a center point of the flow opening 22-1 to one another, a second imaginary connection axis z2 which imaginarily connects a center point of the flow opening 21-2 and a center point of the flow opening 22-2 to one another, a third imaginary connection axis z3 which imaginarily connects a center point of the flow opening 21-3 and a center point of the flow opening 22-3 to one another, and a fourth imaginary connection axis z4 which imaginarily connects a center point of the flow opening 21-4 and a center point of the flow opening 22-4 to one another, in such a way that each of aforementioned imaginary connection axes z1, z2, z3, z4 respectively runs in parallel to each other of said connection axes z1, z2, z3, or z4. The flow dividers 21, 22 can furthermore be designed and arranged in relation to one another such that each of the connection axes z1, z2, z3, and z4 is respectively of the same length as each other of the connection axes z1, z2, z3, or z4. According to a further embodiment of the invention, as also readily apparent from FIG. 7A, 7B, 8, 9A, or 9B, each of the tubes 111, 112, 121, 122 is shaped such that it respectively has a first plane of symmetry yz-111, yz-121, yz-112, or yz-122, namely, for example, one corresponding to a respective imaginary longitudinal sectional plane, and a second plane of symmetry xy-111, xy-121, xy-112, or xy-122 perpendicular thereto, namely, for example, one corresponding to a respective imaginary cross-sectional plane, and that it is respectively mirror-symmetrical both to the associated first plane of symmetry and to the associated second plane of symmetry. The tubes 111, 121, 112, 122 and the flow dividers 21, 22 can furthermore be designed and arranged such that both the plane of symmetry yz-111 runs in parallel to the plane of symmetry yz-121 and the plane of symmetry yz-112 runs in parallel to the plane of symmetry yz-122 and/or that both the plane of symmetry yz-111 is coincident with the plane of symmetry yz-112 and the plane of symmetry yz-121 is coincident with the plane of symmetry yz-122. According to a further embodiment, the tubes 111, 121, 112, 122 and the flow dividers 21, 22 are furthermore designed and arranged such that the tube assembly has at least one first imaginary plane of symmetry yz which is located both between the tube 111 and the tube 121 and between the tube 112 and the tube 122 with respect to which the tube assembly is mirror-symmetrical, as also readily apparent from FIGS. 8 and 9A or their combination. As also readily apparent from a combination of FIGS. 7A, 7B, 8, 9A, and 9B, the tube assembly can furthermore be designed such that its first plane of symmetry yz is, for example, parallel to each of the aforementioned planes of symmetry yz-111, yz-121, yz-112, yz-122 of the tubes 111, 121, 112, or 122 and/or is respectively arranged at the same distance from each of the aforementioned planes of symmetry yz-111, yz-121, yz-112, yz-122 of the tubes 111, 121, 112, or 122; this, for example, also in such a way that the two tubes 111, 121 are respectively parallel to one another or to the aforementioned plane of symmetry yz of the tube assembly and the two tubes 112, 122 are respectively parallel to one another or to the plane of symmetry yz of the tube assembly, and/or that the two tubes 111, 121 lie in a common first imaginary tube plane and the tubes 121, 122 lie in a common second imaginary tube plane. Accordingly, according to a further embodiment of the invention, the tube 111 has a smallest distance from the plane of symmetry yz of the tube assembly that is equal to a smallest distance that the tube 112 has from said plane of symmetry yz and/or the tube 121 has a smallest distance from the imaginary plane of symmetry yz of the tube assembly that is equal to a smallest distance that the tube 122 has from said plane of symmetry yz. According to a further embodiment of the invention, it is furthermore provided that, in addition to the aforementioned first plane of symmetry yz, the tube assembly has a second plane of symmetry xy perpendicular thereto but nevertheless imaginarily intersecting each of the tubes, and is also mirror-symmetrical with respect to said second imaginary plane of symmetry xy.

According to one embodiment of the invention, each of the tubes 111, 121, 112, 122 of the tube assembly is respectively configured to conduct fluid in its respective lumens, namely, for example, in each case a partial volume of the fluid FL1 to be measured, and, meanwhile, to be allowed to vibrate, namely, for example, to respectively carry out forced mechanical vibrations, which, for example, cause a measurement effect corresponding to the at least one measured variable and/or were induced by means of the exciter assembly, about a respectively associated static rest position; this specifically such that each of the tubes of the tube assembly is allowed to vibrate and, starting from its respective first end in the direction of its respective second end, is meanwhile flowed through by fluid. As quite common in the measuring transducers of the type discussed, the aforementioned forced mechanical vibrations can at least proportionately be forced bending vibrations of the tubes about a respective imaginary vibration axis of the tube assembly, namely one imaginarily intersecting the respective tube; this specifically also such that the aforementioned (four) imaginary vibration axes are substantially parallel to one another and/or to the aforementioned imaginary connection axes z1, z2, z3, z4, for example when the tubes are in the static rest position.

According to one embodiment of the invention, the exciter assembly is provided or configured, for example, to convert electrical power fed thereto into forced mechanical vibrations, namely, for example, bending vibrations, of the tubes of the tube assembly about a respective static rest position, while the sensor assembly is, for example, provided or configured to sense mechanical vibrations of said tubes, not least mechanical vibrations and/or bending vibrations of the tubes forced by means of the exciter assembly, and to provide a first vibration measurement signal s41, a second vibration measurement signal s42, a third vibration measurement signal s43, and a fourth vibration measurement signal s44, each of which, for example electrical, vibration measurement signals s41, s42, s43, s44, at least proportionally represents vibrational movements of one or more of the tubes 111, 121, 112, 122 of the tube assembly, for example in each case by means of a respective variable electrical voltage corresponding to vibrational movements of the tubes; this specifically such that the first and second vibration measurement signals s41, s42 follow a change in a mass flow rate of the measured substance conducted in the tube assembly with a change in a first phase difference, namely a change in a difference between a phase angle of the vibration measurement signal s41 and a phase angle of the vibration measurement signal s42, and that the third and fourth vibration measurement signals s43, s44 follow a change in a mass flow rate of the measured substance conducted in the tube assembly with a change in a second phase difference, namely a change in a difference between a phase angle of the vibration measurement signal s43 and a phase angle of the vibration measurement signal s44, and/or such that each of the aforementioned vibration measurement signals s41, s42, s43, s44 follows a change in a density of the measured substance conducted in the tube assembly with a change in a respective signal frequency of at least one spectral signal component. In order to induce and maintain forced mechanical vibrations of the tubes, the exciter assembly according to a further embodiment of the invention has a first vibration exciter 31, which is, for example, electrodynamic, and at least one second vibration exciter 32, which is, for example, electrodynamic and/or structurally identical to the first vibration exciter 31. As also indicated in FIGS. 3A, 3B, 6A, 6B, 7A, and 7B or easily apparent from their combination, the vibration exciter 31 can be mechanically connected to each of the two tubes 111, 121 and the vibration exciter 32 can be mechanically connected to each of the two tubes 112, 122, for example. According to one embodiment of the invention, each of the two vibration exciters 31, 32 is furthermore provided or configured to convert electrical power fed from the electronic measuring and operating system ME into forced mechanical vibrations of the tubes 111, 121 and 112, 122 respectively connected to the respective vibration exciter 31 and 32; this specifically such that the vibration exciter 31 acts differentially on the the two tubes 111, 121, namely can introduce or introduces only equal and opposite excitation forces into the two tubes 111, 121, and that the vibration exciter 32 acts differentially on the two tubes 112, 122, namely can introduce or introduces only equal and opposite excitation forces into the two tubes 112, 122.

In order to generate the aforementioned vibration measurement signals s41, s42, s43, s44, the sensor assembly according to a further embodiment of the invention has a first vibration sensor 41, which is, for example, electrodynamic, for the vibration measurement signal s41; a second vibration sensor 42, which is, for example, electrodynamic and/or structurally identical to the first vibration sensor 41, for the vibration measurement signal s42; a third vibration sensor, which is, for example, electrodynamic and/or structurally identical to the first vibration sensor 41, for the vibration measurement signal s43; and at least one fourth vibration sensor 44, which is, for example, electrodynamic and/or structurally identical to the third vibration sensor 43, for the vibration measurement signal s44. As also indicated in FIGS. 3A, 3B, 6A, 6B, 7A, and 7B or readily apparent from their combination, both the vibration sensor 41 and the vibration sensor 42 can, for example, be mechanically connected to each of the two tubes 111, 121 and both the vibration sensor 43 and the vibration sensor 44 can, for example, be mechanically connected to each of the two tubes 112, 122, for example in such a way that the vibration sensor 41 and the the vibration sensor 43 respectively sense inlet-side vibrational movements of the tubes 111, 121, 112, or 122, and that the vibration sensor 42 and the the vibration sensor 44 respectively outlet-side vibrational movements of the tubes 111, 121, 112, or 122. For example, the vibration sensors may also be positioned such that the vibration sensor 41 is at the same distance from the flow divider 21 as the vibration sensor 42 is from the flow divider 22 and/or that the vibration sensor 43 is at the same distance from the flow divider 21 as the vibration sensor 44 is from the flow divider 22, and/or such that the two vibration sensors 41, 42 are respectively positioned at the same distance from the aforementioned vibration exciter 31 and/or the two vibration sensors 43, 44 are respectively positioned at the same distance from the aforementioned vibration exciter 32. According to a further embodiment of the invention, each of the aforementioned vibration sensors 41, 42 is furthermore provided or configured to sense opposite, possibly also equal and opposite, vibrational movements of the tubes 111, 121 and to convert them into the respective vibration measurement signal s41, s42 (respectively representing said vibrational movements), and each of the aforementioned vibration sensors 43, 44 is furthermore provided or configured to sense opposite, possibly also equal and opposite, vibrational movements of the tubes 112, 122 and to convert them into the respective vibration measurement signal s43, s44 (respectively representing said vibrational movements); this specifically such that each of the vibration sensors 41, 42 differentially senses the vibrational movements of the two tubes 111, 121, namely converts only opposite vibrational movements of said tubes 111, 121 into the respective vibration measurement signal, and each of the vibration sensors 43, 44 differentially senses the vibrational movements of the two tubes 112, 122, namely converts only opposite vibrational movements of said tubes 112, 122 into the respective vibration measurement signal. In order to reduce the number of required connecting lines to the electronic measuring and operating system ME, the two vibration sensors 41, 43 can be electrically connected in series in such a way that the two vibration measurement signals s41, s43 superimpose one another, and/or the two vibration sensors 42, 44 can be electrically connected in series in such a way that the two vibration measurement signals s42, s44 superimpose one another.

Figure 3B:
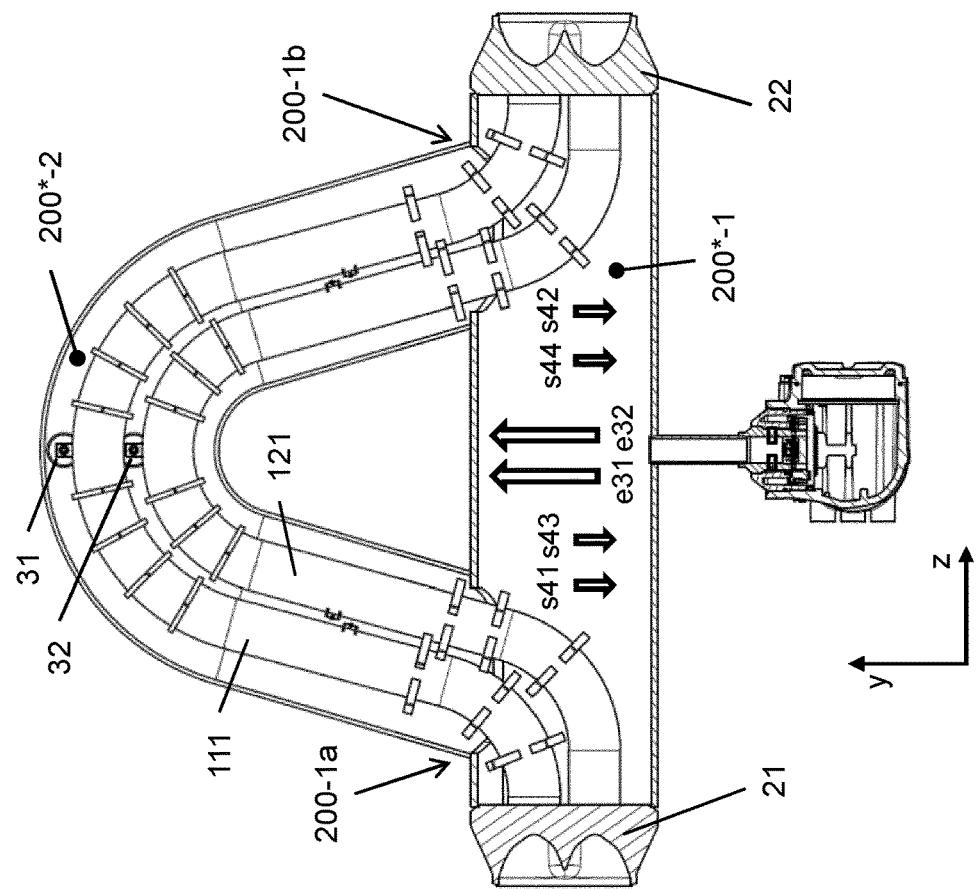
FIGS. 3A and 3B show, respectively, a partially sectional, perspective view and a partially sectional, side view of a measuring transducer suitable for a vibronic measuring system according to FIGS. 1, 2A, or 2B.
Figure 3A:
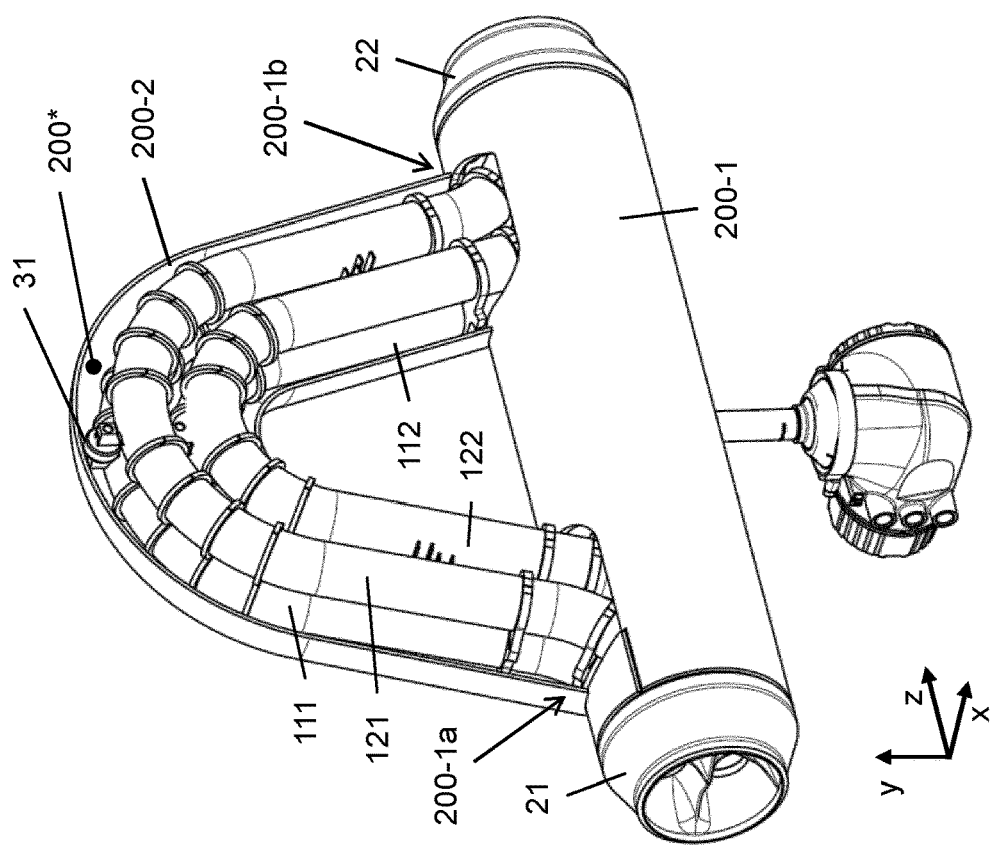
Figure 4:
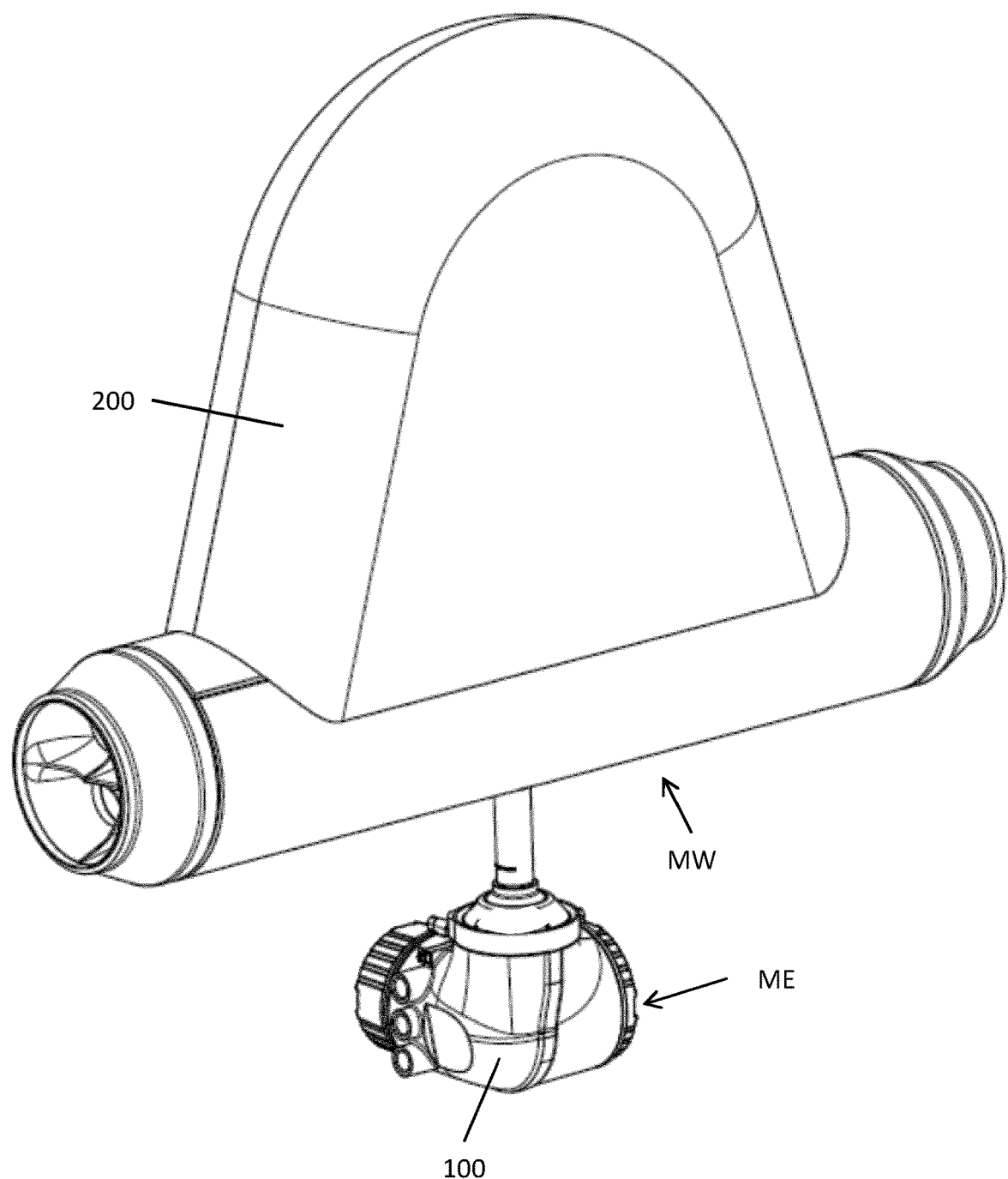
FIGS. 4, 5A and 5B show, respectively, a perspective view, a side view and an end view of a further variant of a vibronic measuring system.
Figure 5B:
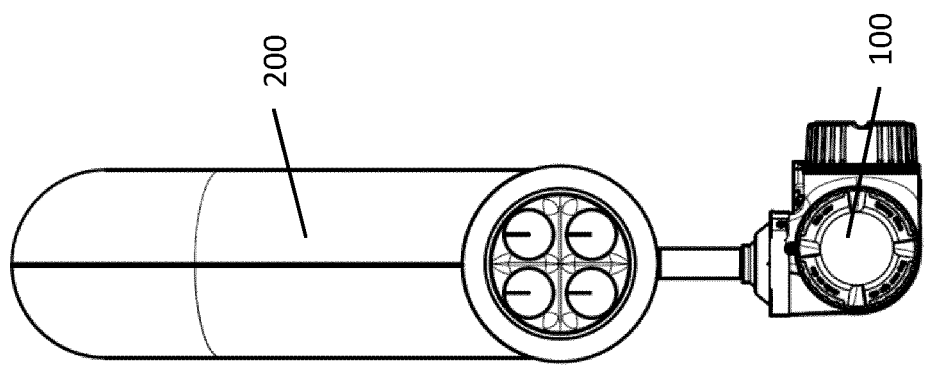
Figure 5A:
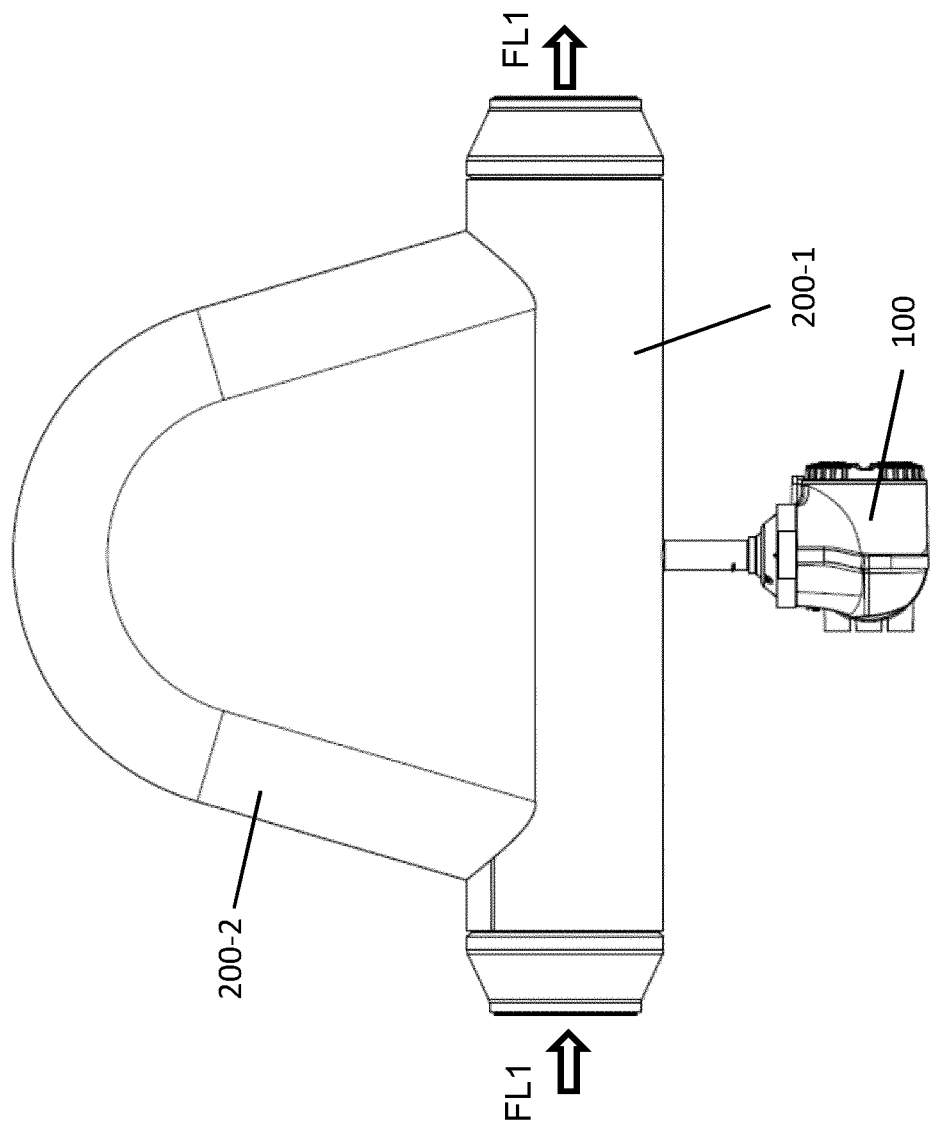
Figure 6B:
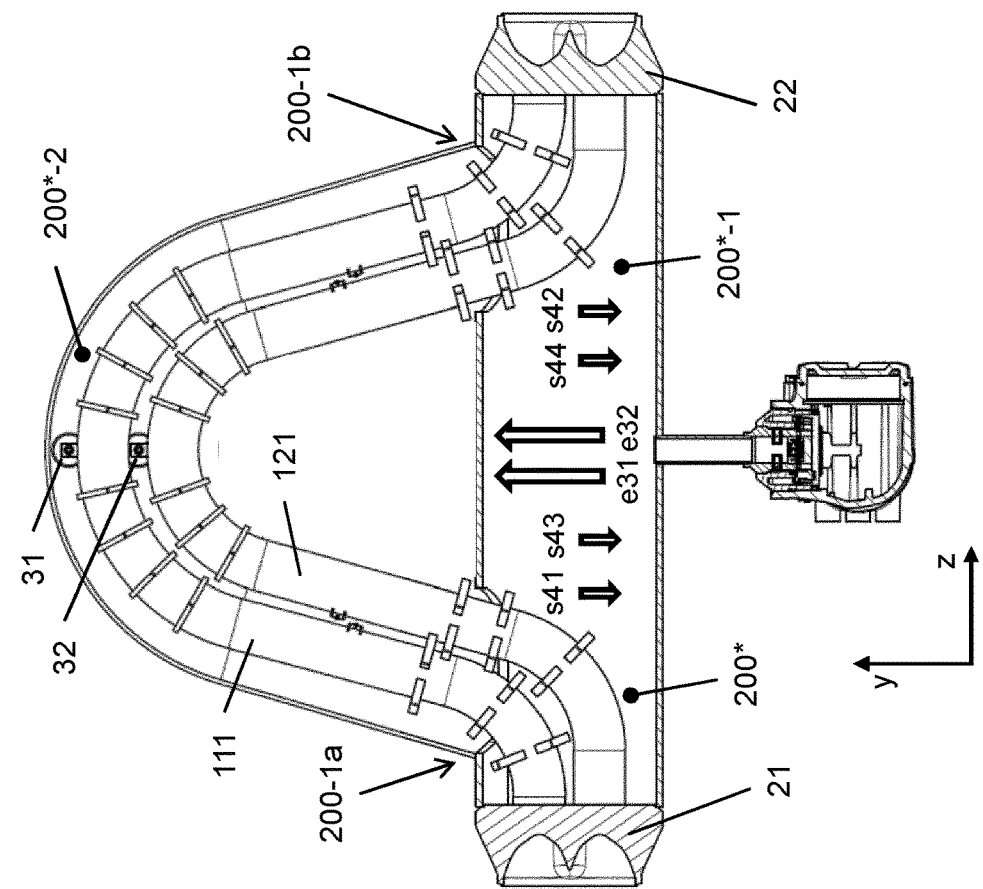
FIGS. 6A and 6B show, respectively, a partially sectional, perspective view and a partially sectional, side view of a measuring transducer suitable for a vibronic measuring system according to FIGS. 4, 5A, or 5B.
Figure 6A:
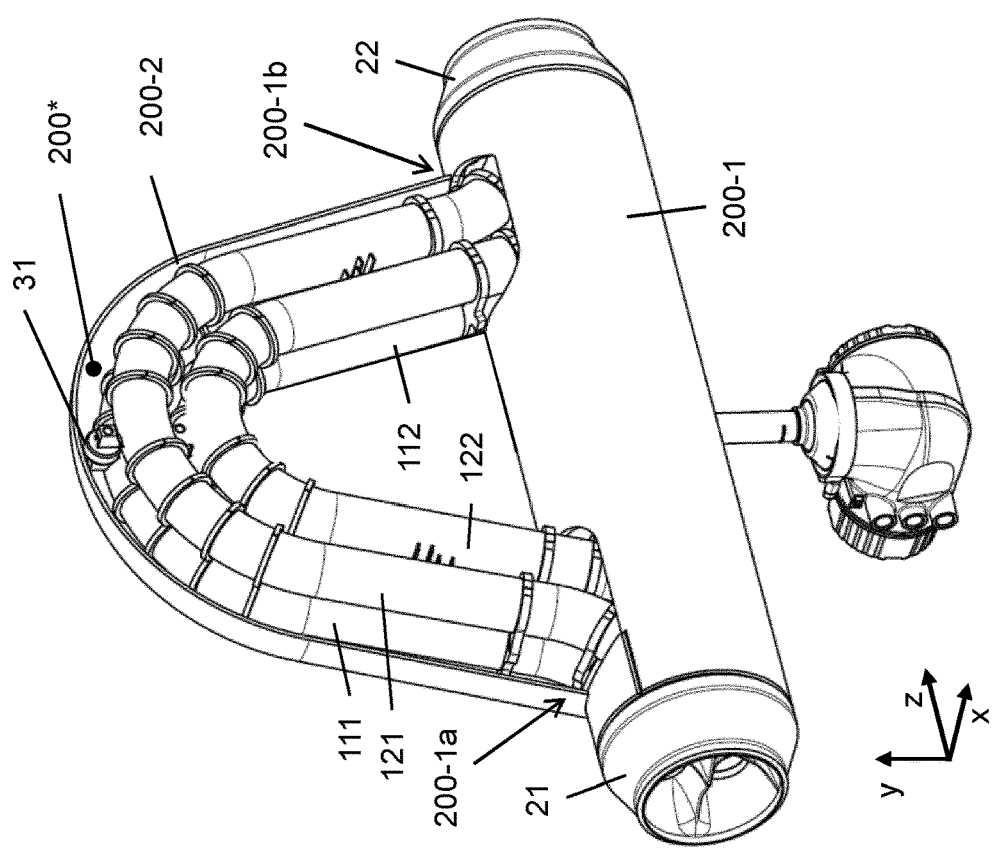

In addition to the measuring transducer MW, the measuring system according to the invention furthermore comprises an electronic measuring and operating system ME electrically coupled both to the aforementioned exciter assembly of the measuring transducer and to the aforementioned sensor assembly of the measuring transducer. Said electronic measuring and operating system ME can, for example, be formed by means of at least one microprocessor and/or by means of at least one digital signal processor and/or be electrically coupled both to the exciter assembly 30 and to the sensor assembly by means of electrical connecting lines in each case. In addition, the electronic measuring and operating system ME, as also respectively indicated in FIGS. 1, 2A, and 2B or 4, 5A, 5B, can be accommodated in a protective electronics housing 100, which is, for example, explosion-resistant or pressure-resistant and/or protects the electronic measuring and operating system ME from splash water. According to a further embodiment of the invention, the electronic measuring and operating system is configured, as also indicated in FIG. 3B or 6B, to at least temporarily generate an electrical first driver signal e31 and to thus feed electrical power into the exciter assembly in such a way that both the tube 111 and the tube 121 respectively carry out useful vibrations at least proportionately, namely forced mechanical vibrations with a first useful frequency, namely a vibration frequency predetermined by the driver signal e31. In addition, the electronic measuring and operating system is furthermore configured to at least temporarily generate an electrical second driver signal e32, for example also simultaneously with the driver signal e31, and to thus feed electrical power into the exciter assembly in such a way that both the tube 112 and the tube 122 carry out, for example also simultaneously with the other two tubes 111, 121, useful vibrations at least proportionately in each case, namely forced mechanical vibrations with at least one second useful frequency, for example deviating from the first useful frequency, namely a vibration frequency predetermined by the electrical driver signal e32. The aforementioned first useful frequency can, for example, correspond to a first resonant frequency of the tube assembly dependent on the density of the fluid FL1 conducted in the tube assembly, namely, for example, a lowest common resonant frequency of a first tube pair formed by means of the tubes 111, 121, and the aforementioned second useful frequency can, for example, correspond to a second resonant frequency of the tube assembly dependent on the density of the fluid FL1 conducted in the tube assembly and optionally also deviating from the first resonant frequency, namely, for example, a lowest common resonant frequency of a second tube pair formed by means of the tubes 112, 122. Moreover, the electronic measuring and operating system can also be provided or configured to receive and evaluate the aforementioned vibration measurement signals s41, s42, s43, s44, namely to generate, based on their aforementioned first phase difference and/or based on their aforementioned second phase difference, mass flow measurement values representing the mass flow rate of the fluid FL1 and/or to generate, based on at least one signal frequency of at least one of the vibration measurement signals s41, s42, s43, s44, namely, for example, based on a signal frequency, corresponding to the aforementioned first useful frequency, of at least one of the vibration measurement signals s41, s42 and/or based on a signal frequency, corresponding to the aforementioned second useful frequency, of at least one of the vibration measurement signals s43, s44, density measurement values representing the density of the fluid FL1. Alternatively or additionally, the electronic measuring and operating system can also be provided or configured to generate, based on at least one of the vibration measurement signals s41, s42, s43, s44 and/or at least one of the aforementioned driver signals e31, e32, viscosity measurement values representing the viscosity of the fluid FL1.

In the measuring transducer according to the invention (or the measuring system formed therewith), as also schematically shown in FIGS. 7A and 7B or easily apparent from their combination, each of the tubes 111, 112, 121, 122 of the tube assembly specifically respectively has at least one straight first partial segment 111-1, 121-1, 112-1, or 122-1 connected to the flow divider 21, for example in a bonded and/or force-fitting and/or positive-locking manner, a circular arc-shaped second partial segment 111-2, 121-2, 112-2, or 122-2 adjoining said first partial segment 111-1, 121-1, 112-1, or 122-1, a straight third partial segment 111-3, 121-3, 112-3, or 122-3 adjoining said second partial segment 111-2, 121-2, 112-2, or 122-2, a circular arc-shaped fourth partial segment 111-4, 121-4, 112-4, or 122-4 adjoining said third partial segment 111-3, 121-3, 112-3, or 122-3, a straight fifth partial segment 111-5, 121-5, 112-5, 122-5 adjoining said fourth partial segment 111-4, 121-4, 112-4, or 122-4 and structurally identical to the respective third partial segment 111-3, 121-3, 112-3, or 122-3, a circular arc-shaped sixth partial segment 111-6, 121-6, 112-6, or 122-6 adjoining said fifth partial segment 111-5, 121-5, 112-5, or 122-5 and both identical in shape and identical in size to the respective second partial segment 111-2, 121-2, 112-2, or 122-2, and a straight seventh partial segment 111-7, 121-7, 112-7, or 122-7 adjoining said sixth partial segment 111-6, 121-6, 112-6, or 122-6 and connected to the flow divider 22, for example in a bonded and/or force-fitting and/or positive-locking manner, and both identical in shape and identical in size to the respective first partial segment 111-1, 121-1, 112-1, or 122-1. Each of the aforementioned straight partial segments 111-1, 121-1, 112-1, 122-1, 111-3, 121-3, 112-3, 122-3, 111-5, 121-5, 112-5, 122-5, 111-7, 121-7, 112-7, or 122-7 can specifically also be hollow cylindrical, namely, in the form of a straight circular cylinder with a cylindrical through-opening running along its imaginary longitudinal axis and, apart from production-related minor local deformations, can be designed with substantially the same wall thickness throughout or substantially the same caliber throughout; likewise, each of the aforementioned circular arc-shaped partial segments 111-2, 121-2, 112-2, 122-2, 111-4, 121-4, 112-4, 122-4, 111-6, 121-6, 112-6, or 122-6 can also have substantially the same wall thickness throughout or substantially the same caliber throughout, for example also in such a way that, apart from production-related minor local deformations, each of the tubes has substantially the same wall thickness throughout or substantially the same caliber throughout, and the respectively enclosed lumen has substantially circular flow cross-sections throughout. In the aforementioned case in which the tube assembly has both the plane of symmetry yz and the plane of symmetry xy perpendicular thereto, it is furthermore provided according to a further embodiment of the invention that said plane of symmetry xy imaginarily intersects each of the tubes in its respective fourth partial segment 111-4, 121-4, 112-4, or 122-4, as also readily apparent from a combination of FIGS. 7A and 7B. According to a further embodiment of the invention, as also indicated in FIG. 9B or also readily apparent from a combination of FIGS. 7A, 7B, 9A and 9B, each of the tubes furthermore respectively has a tube arc height h111, h121, h112, h122, measured, here also within the aforementioned plane of symmetry xy, as a smallest distance of the respective fourth partial segment 111-4, 121-4, 112-4, or 122-4 from the associated imaginary connection axis z1, z2, z3, or z4, namely the one connecting its respective first and second ends, which tube arc height is respectively selected such that each of the tubes 111, 121, 112, 122 respectively has a tube length-to-tube arc height ratio, measured as a quotient of the tube length of the respective tube to the respective tube arc height, that is greater than 2 (2:1), for example greater than 2.5 (2.5:1), and less than 5 (5:1), for example less than 3 (3:1), and/or that each of the tubes 111, 121, 112, 122 respectively has a caliber-to-tube arc height ratio, measured as a quotient of the caliber of the respective tube to the respective tube arc height, that is greater than 0.1, for example also less than 0.2; this, for example, also in such a way that a smallest tube length-to-tube arc height ratio deviates from a largest tube length-to-tube arc height ratio by less than 5% of the largest tube length-to-tube arc height ratio and/or in such a way that a smallest caliber-to-tube arc height ratio deviates from a largest caliber-to-tube arc height ratio by less than 5% of the largest caliber-to-tube arc height ratio.

Each of the straight partial segments 111-1, 121-1, 112-1, 122-1, 111-3, 121-3, 112-3, 122-3, 111-5, 121-5, 112-5, 122-5, 111-7, 121-7, 112-7, or 122-7 (naturally) respectively has a segment length corresponding to a length of a respective imaginary longitudinal axis of said partial segment. Moreover, each of the circular arc-shaped partial segments 111-2, 121-2, 112-2, 122-2, 111-4, 121-4, 112-4, 122-4, 111-6, 121-6, 112-6, or 122-6 (naturally) respectively has a segment or also arc length corresponding to an extended length of an imaginary circular arc-shaped center line of said partial segment, an arc radius corresponding to a radius of said imaginary circular arc-shaped center line, which is, for example, respectively not less than 50 mm, and a center point angle corresponding to a ratio of said segment length to said arc radius, for example in such a way that the respective segment length and/or the respective arc radius of each of the circular arc-shaped partial segments 111-2, 121-2, 112-2, 122-2, 111-3, 121-3, 112-3, 122-3, 111-4, 121-4, 112-4, 122-4, 111-5, 121-5, 112-5, 122-5, 111-6, 121-6, 112-6, or 122-6 is respectively not less than 150% of the caliber of the respective tube 111, 121, 112, 122. Moreover, in the measuring transducer according to the invention, the first and seventh partial segments 111-1, 112-1, 112-7, 112-7 of the first and second tubes 111, 112 are both identical in shape and identical in size in such a way that the segment length of each of these partial segments 111-1, 112-1, 112-7, 112-7 is respectively equal to the segment length of each of the other of said partial segments 111-1, 112-1, 112-7, 112-7; likewise, the first and seventh partial segments 121-1, 122-1, 121-7, 122-7 of the third and fourth tubes 121, 122 are also both identical in shape and identical in size in such a way that the segment length of each of these partial segments 121-1, 122-1, 122-7, 122-7 is respectively equal to the segment length of each of the other of said partial segments 121-1, 122-1, 122-7, 122-7.

According to a further embodiment of the invention, the partial segments 111-4, 121-4 of the tubes 111, 121 are moreover both identical in shape and identical in size in such a way that the segment length, arc radius, and center point angle of each of the two partial segments 111-4, 121-4 are respectively equal to the segment length, arc radius, and center point angle, respectively, of the respective other of the two partial segments 111-4, 121-4, and the partial segments 112-4 and 122-4 are both identical in shape and identical in size in such a way that the segment length, arc radius, and center point angle of each of the partial segments 112-4 and 122-4 are respectively equal to the segment length, arc radius, and center point angle, respectively, of the respective other of the fourth partial segments 112-4 or 122-4 of the tubes 112, 122. According to another embodiment of the invention, the partial segments 111-4 and 121-4 of the tubes 111, 121 are respectively greater than the partial segments 112-4, 122-4 in such a way that the respective segment length and/or arc radius of each of the partial segments 111-4, 121-4 are respectively greater than the segment length and arc radius, respectively, of each of the partial segments 112-4 and 122-4; this specifically such that the segment length of each of the partial segments 111-4, 121-4 is respectively not less than 130% of the segment length of the partial segments 112-4 or 122-4, and/or not more than 200% of the segment length of the partial segments 112-4 or 122-4, and/or that the arc radius of each of the partial segments 111-4, 121-4 is respectively not less than 130% of the arc radius of the partial segments 112-4 or 122-4 and/or not more than 200% of the arc radius of the partial segments 112-4 or 122-4.

Not least in the case mentioned in which both the aforementioned plane of symmetry yz-111 is coincident with the aforementioned plane of symmetry yz-112 and the aforementioned plane of symmetry yz-121 is coincident with the aforementioned plane of symmetry yz-122, the respective arc radius of each of the (larger) partial segments 111-4, 121-4 can also moreover respectively be greater than the arc radius of each of the (smaller) partial segments 112-4 and 122-4; this specifically such that the arc radius of each of the partial segments 111-4, 121-4 respectively is 200% of the arc radius of the partial segments 112-4 or 122-4. Alternatively or additionally, the tubes can moreover advantageously be designed and arranged such that the circular arc-shaped partial segments 111-4, 121-4, 112-4, 122-4 or the imaginary circular arc-shaped center line of said partial segments 111-4, 121-4, 112-4, 122-4 in projection onto the first plane of symmetry yz run in parallel to one another or that the circular arc-shaped center lines partial segments 111-4, 121-4, 112-4, 122-4 in projection onto the first plane of symmetry yz are arc segments of concentric circles.

For example, in the case in which the sensor assembly is formed by means of the aforementioned four vibration sensors 41, 42, 43, 44, as also apparent from FIGS. 7A and 7B or their combination, the vibration sensor 41 can be attached to the partial segment 111-3 of the tube 111 at a distance from both the partial segment 111-2 and the partial segment 111-4 and to the partial segment 121-3 of the tube 121 at a distance from both the partial segment 121-2 and the partial segment 121-4, the vibration sensor 42 can be attached to the partial segment 111-5 of the first tube 111 at a distance from both the partial segment 111-6 and the partial segment 111-4 and to the partial segment 121-5 of the tube 121 at a distance from both the partial segment 121-6 and the partial segment 121-4, the vibration sensor 43 can be attached to the partial segment 112-3 of the tube 112 at a distance from both the partial segment 112-2 and the partial segment 112-4 and to the partial segment 122-3 of the tube 122 at a distance from both the partial segment 122-2 and the partial segment 122-4, or the vibration sensor 44 can be attached to the partial segment 112-5 of the tube 112 at a distance from both the partial segment 112-6 and the partial segment 112-4 and to the partial segment 122-5 of the tube 122 at a distance from both the partial segment 121-6 and the partial segment 122-4; this also, for example, in such a way that none of the vibration sensors 41, 42, 43, 44 is arranged between all tubes 111, 121, 112, 122, but that the vibration sensor 41 is only partially positioned between the partial segment 111-3 and the partial segment 121-3 but nevertheless neither between the partial segments 111-3 and 112-3 nor between the partial segments 121-3 and 122-3, the vibration sensor 42 is only partially positioned between the partial segment 111-5 and the partial segment 112-5 but nevertheless neither between the partial segments 111-5 and 112-5 nor between the partial segments 121-5 and 122-5, the vibration sensor 43 is only partially positioned between the partial segment 112-3 and the partial segment 122-3 but nevertheless neither between the partial segments 112-3 and 111-3 nor between the partial segments 122-3 and 121-3, and the vibration sensor 44 is only partially positioned between the partial segment 112-5 and the partial segment 122-5 but nevertheless neither between the partial segments 112-5 and 111-5 nor between the partial segments 122-5 and 121-5, or, for example, also in such a way that, as schematically also shown in FIGS. 6A and 6B or 7A and 7B, the vibration sensor 41 is positioned both partially between the partial segment 111-3 and the partial segment 112-3 and partially between the partial segment 121-3 and the partial segment 122-3, and the vibration sensor 42 is positioned both partially between the partial segment 111-5 and the partial segment 112-5 and partially between the partial segment 121-5 and the partial segment 122-5, and/or that the vibration sensor 43 is positioned both partially between the partial segment 111-3 and the partial segment 112-3 and partially between the partial segment 121-3 and the partial segment 122-3, and the vibration sensor 44 is positioned both partially between the partial segment 111-5 and the partial segment 112-5 and partially between the partial segment 121-5 and the partial segment 122-5. Moreover, the vibration sensors 41, 42 can respectively be spaced both at the same distance from the partial segment 111-4 and at the same distance from the partial segment 121-4, and/or the vibration sensors 43, 44 can respectively be spaced both at the same distance from the partial segment 112-4 and at the same distance from the partial segment 122-4. For example, in the other mentioned case in which the exciter assembly is formed by means of the aforementioned two vibration exciters 31, 32, as also apparent from FIGS. 7A and 7B or their combination, the vibration exciter 31 can be attached to the partial segment 111-4 of the tube 111 at a distance from both the partial segment 111-3 and the partial segment 111-5 and to the partial segment 121-4 of the tube 121-4 at a distance from both the partial segment 121-3 and the partial segment 121-5, and the vibration exciter 32 can be attached to the partial segment 112-4 of the tube 112 at a distance from both the partial segment 112-3 and the partial segment 112-5 and to the partial segment 122-4 of the tube 122 at a distance from both the partial segment 122-3 and the partial segment 122-5; this, for example, also in such a way that the vibration exciter 31 is spaced respectively at the same distance both from the partial segment 111-3 and the partial segment 111-5 of the tube 111 and from the partial segment 121-3 and the partial segment 121-5 of the tube 121, and/or that the vibration exciter 32 is spaced respectively at the same distance both from the partial segment 112-3 and the partial segment 112-5 of the tube 112 and from the partial segment 122-3 and the partial segment 122-5 of the tube 122; this, for example, also in such a way that none of the vibration exciters 31, 32 is arranged between all tubes 111, 121, 112, 122, but that the vibration exciter 31 is only partially positioned between the partial segment 111-4 and the partial segment 121-4 but nevertheless neither between the partial segments 111-4 and 112-4 nor between the partial segments 121-4 and 122-4, and the vibration exciter 32 is only partially positioned between the partial segment 112-4 and the partial segment 122-4 but nevertheless neither between the partial segments 112-4 and 111-4 nor between the partial segments 122-4 and 121-4, or, for example, also in such a way that, as respectively shown in FIGS. 6A and 6B or 7A and 7B, at least one of the vibration exciters 31, 32 is positioned both partially between the partial segment 111-4 and the partial segment 112-4 and partially between the partial segment 121-4 and the partial segment 122-4.

In order to protect the tubes of the tube assembly and further components of the measuring transducer attached thereto, not least the aforementioned vibration exciters 31, 32 or vibration sensors 41, 42, 43, 44, against harmful environmental influences, in order to avoid undesired sound emissions by the vibrating tubes or also in order to collect fluid escaping from a tube assembly that has sprung a leak, the measuring transducer comprises according to a further embodiment of the invention, as also quite common in measuring transducers of the type discussed or measuring systems formed therewith, a transducer housing 200 encasing the tubes 111, 121, 112, 122 of the tube assembly. Said transducer housing 200 has at least one cavity 200\*, which is, for example, also hermetically closed and within which, as also apparent from a combination of FIGS. 1, 2A, 2B, 3A, and 3B, or 4, 2A, 5B, 6A, and 6B, each of the tubes 111, 121, 112, 122 of the tube assembly is arranged. The transducer housing may, for example, have a compressive strength that is greater than a greatest compressive strength of the tubes of the tube assembly and/or that is more than 50 bar. In the exemplary embodiments shown in FIGS. 1, 2A, 2B, 3A, 3B, 4, 2A, 5B, 6A, and 6B, the transducer housing 200 comprises a support element 200-1 extending from a first end to a second end with a support element length, wherein the support element 200-1 is mechanically connected, for example bonded, at its first end to the first flow divider and at its second end to the second flow divider. Said support element 200-1 has at least one hollow space **200\*-1 encased by a wall, for example a metallic wall, and forming a partial region of the aforementioned cavity 200\* of the transducer housing 200, and can, for example, be substantially cylindrical, possibly also at least in sections hollow cylindrical, or tubular. The wall of the support element 200-1 can, for example, consist of a steel, namely, for example, a stainless steel or a structural steel, and/or of the same material as the wall of the tubes 111, 121, 112, 122. Among other things, the support element can serve to absorb mechanical forces and/or moments introduced into the measuring transducer via a connected process line during operation of the measuring system, for example in such a way that no or only very small portions, namely negligible for the desired measuring accuracy of the measuring system, of said forces and/or moments are transferred to the tube assembly arranged within the transducer housing. In addition to the support element, the transducer housing 200 in the exemplary embodiments shown here furthermore has a casing element 200-2 which is connected mechanically, namely, for example, bonded, to the support element 200-1 of the transducer housing. As also apparent from a combination of FIGS. 1, 2A, 3A, and 3B, said casing element 200-2 can, for example, be tubular in such a way that it has a hollow space 200\*-2, for example a partially circular cylindrical hollow space, encased by a wall and forming a partial region of the aforementioned cavity 200\*. Alternatively, as also apparent from a combination of FIGS. 4, 5A, 6A, and 6B, the casing element 200-2 can, for example, also be cap-shaped in such a way that a wall of the casing element, together with a segment of the wall of the support element, form or encase the aforementioned hollow space 200\*-2. As also apparent from FIG. 3A, 3B or 6A, 6B, the transducer housing and the tube assembly are furthermore designed such that each of the tubes 111, 121, 112, 122 of the tube assembly is arranged only partially within the hollow space 200\*-1 of the support element 200-1 or each of the tubes 111, 121, 112, 122 is arranged only partially within the hollow space 200\*-2 of the casing element 200-2; this also, for example, as readily apparent from FIG. 3A, 3B or 6A, 6B, in such a way that each of the partial segments 111-4, 121-4, 112-4, 122-4 of the tubes is arranged exclusively within the hollow space 200\*-2 of the casing element 200-2, and/or that each of the partial segments 111-3, 121-3, 112-3, 122-3, 111-5, 121-5, 112-5, 122-5 of the tubes is arranged at least predominantly within the hollow space 200\*-2 of the casing element 200-2, and/or that each of the partial segments 111-2, 121-2, 112-2, 122-2, 111-6, 121-6, 112-6, 122-6 of the tubes is arranged at least predominantly outside the hollow space 200\*-2 of the casing element 200-2, or that, conversely, each of the second partial segments 111-2, 121-2, 112-2, 122-2, 111-6, 121-6, 112-6, 122-6 of the tubes is arranged at least predominantly within the hollow space 200\*-1 of the support element 200-1 and/or that each of the partial segments 111-3, 121-3, 112-3, 122-3, 111-5, 121-5, 112-5, 122-5 of the tubes is arranged at least predominantly outside the hollow space 200\*-1 of the support element 200-1. In order to pass the tubes 111, 121, 112, 122 laterally through the support element 200-1, its wall, according to a further embodiment of the invention, has a first opening 200-1a and at least one second opening 200-1b spaced apart from said opening 200-1a along an imaginary envelope line of the wall. As readily apparent from FIG. 3A, 3B or 6A, 6B, each of the two openings 200-1a, 200-1b respectively forms a partial region of the aforementioned cavity 200\* of the transducer housing 200. Moreover, each of the tubes 111, 121, 112, 122 of the tube assembly respectively extends both through the opening 200-1a and through the opening 200-1b. For the purpose of avoiding contacts, which are harmful for the measurement, of the vibrating tubes with one another or with that of the transducer housing, each of the tubes 111, 121, 112, 122 has only such distances from the respective other tubes and from the transducer housing 200, not least also from a respective edge of each of the two aforementioned openings 200-1a, 200-1b in the wall of the support element 200-1, that respectively enable, under all operating conditions, free vibrations with a sufficient vibration amplitude for the measurement. According to one embodiment of the invention, each of the tubes 111, 121, 112, 122 of the tube assembly therefore respectively has a smallest distance from the transducer housing 200 and/or a smallest distance from each other of the tubes 111, 121, 112, or 122 that is greater than 5 mm. Accordingly, each of the tubes also respectively has a smallest distance from an edge of the opening 200-1a, or a smallest distance from an edge of the opening 200-1b, that is greater than 5 mm. On the other hand, in order to also be able to provide a measuring transducer that is as compact as possible, one or more, possibly also each of the aforementioned smallest distances is to be kept less than 10 mm according to a further embodiment. According to a further embodiment of the invention, it is furthermore provided that, both within the opening 200-1a and within the opening 200-1b, as also apparent from a combination of FIGS. 3B and 6B, a respective smallest distance between the tube 111 and the tube 112 is respectively less than the aforementioned smallest distance between the partial segment 111-4 of the tube 111 and the partial segment 112-4 of the tube 112**, or that, both within the opening 200-1a and within the opening 200-1b, a respective smallest distance between the tube 121 and the tube 122 is respectively less than the aforementioned smallest distance between the fourth partial segment 121-4 of the tube 121 and the partial segment 122-4 of the fourth tube 122.

Figure 10:
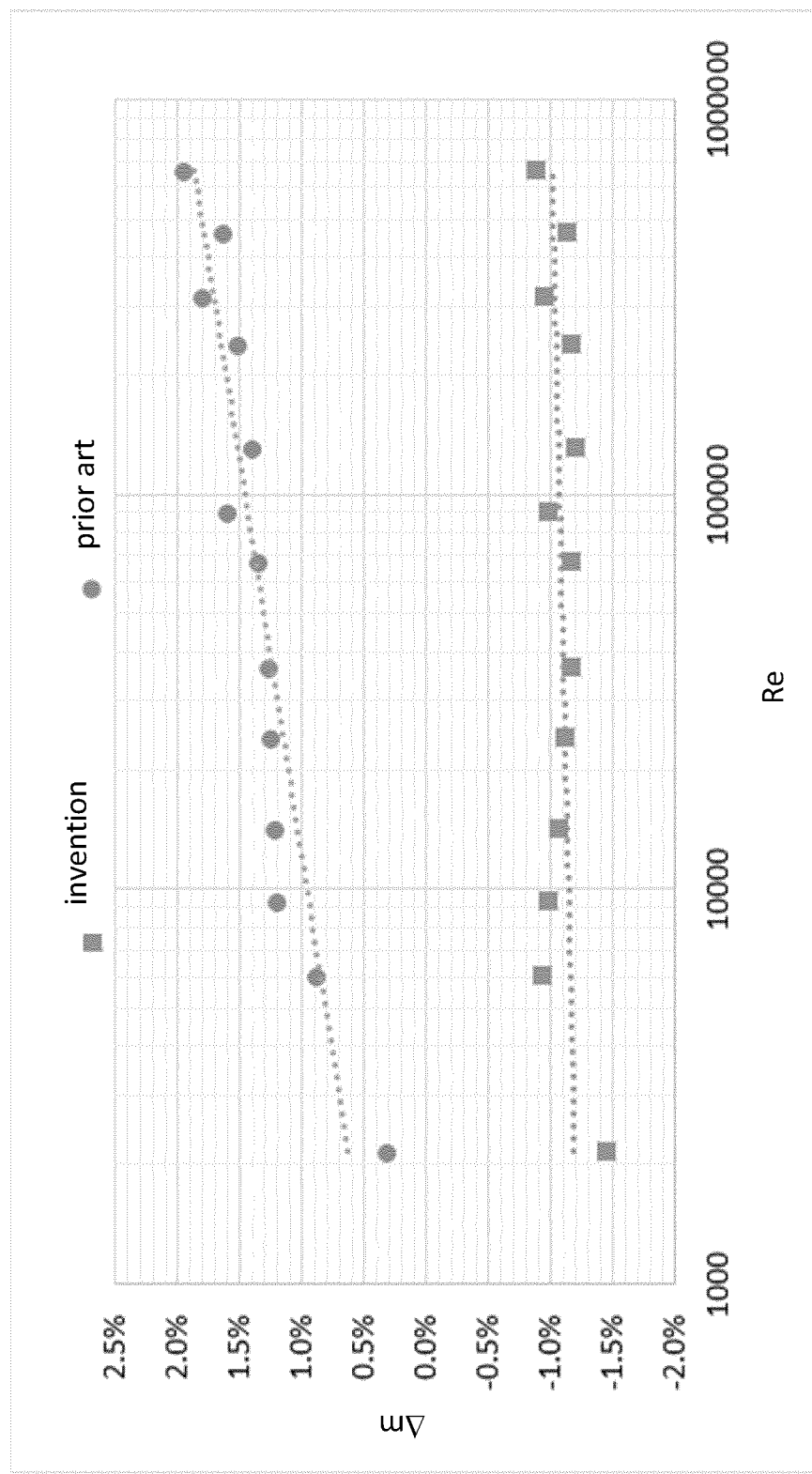
FIG. 10 shows a chart of deviation between partial mass flows, measured values determined experimentally, namely with a tube assembly according to the invention of the present disclosure according to FIGS. 7A and 7B or a measuring transducer formed therewith ("Invention") and with a conventional measuring transducer formed by means of a tube assembly having four equally long tubes ("Prior art").

In order to homogenize the flow profiles of the fluid flowing along the flow paths formed by means of the four tubes 111, 121, 112, 122 formed here to be structurally identical only in pairs, or in order to achieve a distribution, as shown by way of example in FIG. 10 ("Invention"), of the aforementioned partial mass flows to the four tubes 111, 121, 112, 122 that is as constant as possible over the broadest possible Reynolds number range, not least also in comparison to distributions also shown in FIG. 10 by way of example in tube assemblies ("Prior art") known from the prior art, and concomitantly therewith, in order to achieve a high measuring accuracy that is as constant as possible within the Reynolds number range, in the measuring transducer according to the invention, the circular arc-shaped second partial segments 111-2, 121-2, 112-2, and 122-2, which are here on the inlet side, and the circular arc-shaped sixth partial segments 111-6, 121-6, 112-6, and 122-6, which are here on the outlet side, are specifically both identical in shape and identical in size in such a way that the segment length, arc radius, and center point angle of each of the second partial segments 111-2, 121-2, 112-2, and 122-2 are respectively equal to the segment length, arc radius, and center point angle, respectively, of each of the other of the second partial segments 111-2, 121-2, 112-2, or 122-2, and that the segment length, arc radius, and center point angle of each of the sixth partial segments 111-6, 121-6, 112-6, and 122-6 are respectively equal to the segment length, arc radius, and center point angle, respectively, of each of the other of the sixth partial segments 111-6, 121-6, 112-6, or 122-6; this especially also in such a way that the tube assembly of the measuring transducer according to the invention has a total of precisely eight structurally identical, circular arc-shaped partial segments 111-2, 121-2, 112-2, 122-2, 111-6, 121-6, 112-6, and 122-6. Not least for the purpose of simplifying the design of the measuring transducer or for the purpose of reducing production costs, according to a further embodiment of the invention, the respective arc radius of each of the circular arc-shaped partial segments 121-4, 122-4 of the tubes 121, 122 is equal to the arc radius of each of the circular arc-shaped partial segments 111-2, 112-2, 121-2, 122-2, 111-6, 112-6, 121-6, and 122-6. For example, the circular arc-shaped partial segments can also be designed such that the segment length of each of the circular arc-shaped partial segments 121-4, 122-4 of the tubes 121, 122 is twice as large as the segment length of each of the partial segments 111-2, 112-2, 121-2, 122-2, 111-6, 112-6, 121-6, and 122-6, and/or that the center point angle of each of the circular arc-shaped partial segments 121-4, 122-4 of the tubes 121, 122 is twice as large as the center point angle of each of the partial segments 111-2, 112-2, 121-2, 122-2, 111-6, 112-6, 121-6, and 122-6.

In order to easily again compensate for the differences in length concomitant with the tube geometry of the aforementioned (eight) circular arc-shaped partial segments 111-2, 121-2, 112-2, 122-2, 111-6, 121-6, 112-6, and 122-6, namely, for example, in a manner enabling the use of conventional flow dividers or in a manner not requiring any structural changes in comparison to conventional flow dividers, the first and seventh partial segments 121-1, 122-1, 121-7, and 122-7 of the third and fourth tubes 121, 122 in the measuring transducer according to the invention, are, according to a further embodiment of the invention, respectively correspondingly greater than the first and seventh partial segments 112-1, 112-1, 112-7, and 112-7 of the first and second tubes 111, 112 in such a way that the segment length of each partial segment 121-1, 122-1, 121-7, and 122-7 is respectively greater than the segment length of each of the partial segments 112-1, 112-1, 112-7, and 112-7; this, for example, also in such a way that the respective segment length of each of the partial segments 121-1, 122-1, 121-7, 122-7 is respectively not less than 200% of the segment length of the partial segment 112-1, 112-1, 112-7, or 112-7 and/or not less than 100% of the caliber of the respective tube 121 or 122 and/or that the respective segment length of each of the partial segments 121-1, 122-1, 121-7, 122-7 is respectively not more than 400% of the segment length of said partial segments 112-1, 112-1, 112-7, or 112-7 and/or not more than 300% of the caliber of the respective tube 121 or 122; this, for example, also in the case described above in which the tubes 112, 122, i.e., the tubes with an available, nominally most limited space within the plane of symmetry yz, have a tube length that is greater than the tube length of the tubes 111, 121. According to a further embodiment of the invention, it is furthermore provided that the respective segment length of each of the partial segments 111-1, 111-7, 121-1, 121-7 is not less than 20% and/or not more than 100% of the caliber of the tube 111 or 121. For the purpose of a further simplification of the design of the measuring transducer, not least also in order to achieve the highest possible measuring sensitivity to the measured variable to be detected by means of the measuring transducer even if the dimensions are as compact as possible, according to a further embodiment of the invention, the tubes 111, 112, 121, 122 are designed and arranged such that, as also schematically shown in FIGS. 7A and 7B, the partial segments 111-1, 121-1, 112-1, 122-1 or their longitudinal axes run in parallel to one another and that the partial segments 111-7, 121-7, 112-7, 122-7 or their longitudinal axes run in parallel to one another. Alternatively or additionally, the tubes can furthermore also be designed and arranged such that the partial segments 111-3, 121-3, 112-3, 122-3 or their longitudinal axes run in parallel to one another, and that, as schematically shown in FIGS. 7A and 7B, the partial segments 111-5, 121-5, 112-5, 122-5 or their longitudinal axes run in parallel to one another.

The invention claimed is:

1. A measuring transducer for a vibronic measuring system configured to measure at least one of a mass flow, a density and a viscosity of a flowing fluid, the measuring transducer comprising:
   a tube assembly having an inlet side and an outlet side, which tube assembly includes:
   a curved first tube that is, at least in sections, V-shaped and/or one-piece;
   a curved second tube that is structurally identical to the first tube;
   a curved third tube that is, at least in sections, V-shaped and/or one-piece;
   a curved fourth tube that is structurally identical only to the third tube;
   a first flow divider adapted as a line branching unit and/or located on the inlet side and including four flow openings; and
   a second flow divider structurally identical to the first flow divider and/or adapted as a line merging unit and/or located on the outlet side and including four flow openings;

an exciter assembly configured to induce and maintain mechanical vibrations of the tube assembly, including bending vibrations of each of the first, second, third and fourth tubes about a respective rest position; and a sensor assembly configured to sense mechanical vibrations of the tube assembly, including the bending vibrations of each of the first, second, third and fourth tubes about the respective rest position, and to generate vibration measurement signals respectively representing vibrational movements of one or more of the first, second, third, and fourth tubes, wherein each of the first, second, third and fourth tubes extends from a respective first end of the respective tube to a respective second end of the tube, each having a tube length corresponding to an extended length of a center line of the respective tube, a tube wall, and a lumen enclosed thereby, wherein each of the first, second, third and fourth tubes is connected to each of the first and second flow dividers such that:

the first tube opens with its first end into a first flow opening of the first flow divider and with its second end into a first flow opening of the second flow divider;

the second tube opens with its first end into a second flow opening of the first flow divider and with its second end into a second flow opening of the second flow divider;

the third tube opens with its first end into a third flow opening of the first flow divider and with its second end into a third flow opening of the second flow divider; and the fourth tube opens with its first end into a fourth flow opening of the first flow divider and with its second end into a fourth flow opening of the second flow divider, wherein each of the first, second, third and fourth tubes respectively has at least:

a straight first segment connected to the first flow divider;

an arcuate second segment adjoining the first segment;

a straight third segment adjoining the second segment;

an arcuate fourth segment adjoining the third segment;

a straight fifth segment adjoining the fourth segment and identical in both shape and size to the third segment;

an arcuate sixth segment adjoining the fifth segment and identical in both shape and size to the second segment; and a straight seventh segment adjoining the sixth segment, connected to the second flow divider, and identical in both shape and size to the first segment, wherein each of the first, third, fifth and seventh segments has a segment length corresponding to a length of a respective longitudinal axis of the respective segment, and wherein each of the second, fourth and sixth segments has a segment length corresponding to an extended length of an arcuate center line of the respective segment, an arc radius corresponding to a radius of the arcuate center line, and a center point angle corresponding to a ratio of the segment length to the arc radius, wherein each second segment is identical in both shape and size such that the segment length, arc radius and center point angle of each second segment are equal to the corresponding segment length, arc radius and center point angle, respectively, of each other second segment, wherein each sixth segment is identical in both shape and size such that the respective segment length, arc radius and center point angle of each sixth segment are equal to the segment length, arc radius and center point angle, respectively, of each other sixth segments, wherein each of the first, second, third and fourth tubes has a respective caliber corresponding to a largest inner diameter of each respective tube, and wherein at least one of:

the respective tube length of each of the first and second tubes is respectively greater than the tube length of each of the third or fourth tubes such that the respective tube length of each of the first and second tubes is respectively greater than 101% of the tube length of either the third or fourth tubes and/or respectively less than 105% of the tube length of either the third or fourth tubes;

each of the first, third, fifth and seventh segments is hollow cylindrical; and the respective segment length of each of the first and seventh segments of the third and fourth tubes is respectively greater than the segment length of each of the first and seventh segments of the first and second tubes such that the respective segment length of each of the first and seventh segments of the third and fourth tubes is respectively not less than 200% of the segment length of the first and seventh segments of the first and second tubes and/or respectively not more than 400% of the segment length of the first and seventh segments of the first and second tubes;

the respective segment length of each first and seventh segment of the third and fourth tubes is not less than 100% of the respective caliber of the third or fourth tube;

the respective segment length of each first and seventh segment of the first and second tubes is not more than 100% of the respective caliber of the first or second tube.

2. The measuring transducer of claim 1, wherein the first, second, third and fourth tubes are configured and arranged such that:

the first segments or their longitudinal axes extend parallel to each other; and the seventh segments or their longitudinal axes extend parallel to each other.

3. The measuring transducer of claim 1, wherein the first, second, third and fourth tubes are configured and arranged such that:

the third segments or their longitudinal axes extend parallel to each other; and the fifth segments or their longitudinal axes extend parallel to each other.

4. The measuring transducer of claim 1, wherein the first and seventh segments of the first and second tubes are identical in both shape and size; and wherein the first and seventh segments of the third and fourth tubes are identical in both shape and size.

5. The measuring transducer of claim 1, wherein the first and seventh segments of the third and fourth tubes are each larger than the first and seventh segments of the first and second tubes such that the respective segment length of each of the first and seventh segments of the third and fourth tubes is greater than the respective segment length of each of the first and seventh segments of the first and second tubes.

6. The measuring transducer of claim 1, wherein each respective caliber is not less than 20 mm.

7. The measuring transducer of claim 6, wherein the first, second, third and fourth tubes are configured such that at least one of the following are met:
- the caliber of each of the first, second, third and fourth tubes is equal to each other caliber of the first, second, third and fourth tubes;
- the caliber of each of the first, second, third and fourth tubes is more than 40 mm;
- the respective segment length of each first and seventh segment of the first and second tubes is not less than 20% of the respective caliber of the first or second tube;
- the respective segment length of each first and seventh segment of the fourth and third tubes is not more than 300% of the respective caliber of the third or fourth tube;
- the respective segment length of each of the second, third, fourth, fifth and sixth segments is not less than 150% of the respective caliber of the first, second, third or fourth tube;
- the respective arc radius of each of the second, fourth, fifth and sixth segments is not less than 150% of the respective caliber of the first, second, third or fourth tube;
- each of the first, second, third and fourth tubes has a tube length-to-caliber ratio, measured as a quotient of the respective tube length to the respective caliber, that is greater than 25:1 and less than 30:1; and
- each of the first, third, fifth and seventh segments has a caliber that remains constant over its respective segment length.

8. The measuring transducer of claim 1, wherein the first, second, third and fourth tubes are configured such that at least one of the following are met:
- the arc radius of each fourth segment of the first and second tubes is not less than 130% of the respective arc radius of the fourth segments of the third and fourth tubes;
- the arc radius of each of the second, third, fourth, fifth and sixth segments is not less than 50 mm;
- the arc radius of each fourth segment of the third and fourth tubes is equal to the respective arc radius of each of the second or sixth segments;
- the segment length of each fourth segment of the first and second tubes is not less than 130% of the respective segment length of the fourth segments of the third and fourth tubes;
- the center point angle of each fourth segment is equal to the respective center point angle of each other fourth segment; and
- the center point angle of each fourth partial segment is greater than the respective center point angle of each second and sixth segment such a way that the center point angle of each fourth partial segment is twice as great as the respective center point angle of each of the second and sixth segments.

9. The measuring transducer of claim 1, wherein the fourth segments of the first and second tubes are identical in both shape and size such that the respective segment length, arc radius and center point angle of each fourth segment of the first and second tubes are equal to the segment length, arc radius and center point angle, respectively, of each other fourth segment of the first and second tubes; and
- wherein the partial segments of the third and fourth tubes are identical in both shape and size such that the segment length, arc radius and center point angle of each fourth segment of the third and fourth tubes are equal to the segment length, arc radius and center point angle, respectively, of each other fourth segment of the third and fourth tubes.

10. The measuring transducer of claim 1, wherein the first, second, third and fourth tubes are configured such that at least one of the following are met:
- each of the first, second, third and fourth tubes has a first plane of symmetry and a second plane of symmetry perpendicular thereto, and wherein each of the first, second, third and fourth tubes is mirror-symmetrical both to the corresponding first plane of symmetry and to the corresponding second plane of symmetry;
- both a smallest wall thickness of the tube wall of the first tube and a smallest wall thickness of the tube wall of the second tube are respectively equal to a smallest wall thickness of the tube wall of the third tube and respectively equal to a smallest wall thickness of the tube wall of the fourth tube;
- the tube wall of each of the first, second, third and fourth tubes consists of the same material;
- each of the first, second, third and fourth tubes is connected in a bonded manner to both the first flow divider and the second flow divider; and
- the tube assembly has precisely four tubes such that no further tube is connected to the first flow divider and the second flow divider.

11. The measuring transducer of claim 1, wherein the first, second, third and fourth tubes are configured and arranged such that the tube assembly has a first plane of symmetry disposed both between the first and second tubes and between the third and fourth tubes, defining an imaginary reference plane with respect to which the tube assembly is mirror-symmetrical.

12. The measuring transducer of claim 11, wherein the first, second, third and fourth tubes are configured such that at least one of the following are met:
- the first tube has a smallest distance from the first plane of symmetry of the tube assembly that is equal to a smallest distance of the third tube from the first plane of symmetry of the tube assembly;
- the second tube has a smallest distance from the first plane of symmetry of the tube assembly that is equal to a smallest distance of the fourth tube from the first plane of symmetry of the tube assembly;
- each of the first, second, third and fourth tubes is parallel to the first plane of symmetry of the tube assembly; and
- the tube assembly has a second plane of symmetry perpendicular to the first plane of symmetry of the tube assembly and intersecting each respective fourth segment of the first, second, third and fourth tubes, and wherein the tube assembly is mirror-symmetric with respect to the second plane of symmetry of the tube assembly.

13. The measuring transducer of claim 1, wherein the tube assembly has:
- a first connection axis which extends through a center point of the first flow opening of the first flow divider and a center point of the first flow opening of the second flow divider;
- a second connection axis which extends through a center point of the second flow opening of the first flow divider and a center point of the second flow opening of the second flow divider;
- a third connection axis which extends through a center point of the third flow opening of the first flow divider and a center point of the third flow opening of the second flow divider; and a fourth connection axis which extends through a center point of the fourth flow opening of the first flow divider and a center point of the fourth flow opening of the second flow divider such that each of the first, second, third and fourth connection axes extend parallel to each other.

14. The measuring transducer of claim 13, wherein the first, second, third and fourth tubes are configured such that at least one of the following are met:
- each of the first, second, third and fourth tubes has a tube arc height, defining a greatest distance of an apex of the respective fourth segment from the corresponding connection axis, which tube arc height is configured such that each of the first, second, third and fourth tubes has a tube length-to-tube arc height ratio, measured as a quotient of the tube length of the respective tube to the respective tube arc height, that is greater than 2:1 and less than 3:1;
- each of the first, second, third and fourth tubes has a caliber-to-tube arc height ratio, measured as a quotient of the caliber of the respective tube to the respective tube arc height, that is greater than 0.1 and less than 0.2;
- the first, second, third and fourth tubes are configured and arranged such that each first segment is aligned with the corresponding connection axis such that the respective longitudinal axis of each first segment respectively coincides with the corresponding connection axis; and
- the first, second, third and fourth tubes are configured and arranged such that each seventh segment is aligned with the corresponding connection axis such that the respective longitudinal axis of each seventh segment coincides with the corresponding connection axis.

15. The measuring transducer of claim 1, wherein the sensor assembly includes a first vibration sensor, a second vibration sensor that is electrodynamic and/or structurally identical to the first vibration sensor, a third vibration sensor that is electrodynamic and/or structurally identical to the first vibration sensor, and a fourth vibration sensor that is electrodynamic and/or structurally identical to the third vibration sensor.

16. The measuring transducer of claim 15, wherein:
- the first vibration sensor is mounted to the third segment of the first tube at a distance from both the second segment of the first tube and the fourth segment of the first tube and mounted to the third segment of the second tube at a distance from both the second segment of the second tube and the fourth segment of the second tube;
- the second vibration sensor is mounted to the fifth segment of the first tube at a distance from both the sixth segment of the first tube and the fourth segment of the first tube and mounted to the fifth segment of the second tube at a distance from both the sixth segment of the second tube and the fourth segment of the second tube;
- the third vibration sensor is mounted to the third segment of the third tube at a distance from both the second segment of the third tube and the fourth segment of the third tube and mounted to the third segment of the fourth tube at a distance from both the second segment of the fourth tube and the fourth segment of the fourth tube; and
- the fourth vibration sensor is mounted to the fifth segment of the third tube at a distance from both the sixth segment of the third tube and the fourth segment of the third tube and mounted to the fifth segment of the fourth tube at a distance from both the sixth segment of the fourth tube and the fourth segment of the fourth tube.

17. The measuring transducer of claim 1, wherein the exciter assembly includes a first vibration exciter and a second vibration exciter, which is electrodynamic and/or structurally identical to the first vibration exciter.

18. The measuring transducer of claim 17, wherein the first vibration exciter is mounted to the fourth segment of the first tube at a distance from both the third segment of the first tube and the fifth segment of the first tube and mounted to the fourth segment of the second tube at a distance from both the third segment of the second tube and the fifth segment of the second tube, and
- wherein the second vibration exciter is mounted to the fourth segment of the third tube at a distance from both the third segment of the third tube and the fifth segment of the third tube and mounted to the fourth segment of the fourth tube at a distance from both the third segment of the fourth tube and the fifth segment of the fourth tube.

19. The measuring transducer of claim 1, wherein the first flow divider includes a first connecting flange configured to connect the tube assembly to a first line segment of a process line supplying the flowing fluid to the measuring transducer, and
- wherein the second flow divider includes a second connecting flange configured to connect the tube assembly to a second line segment of a process line discharging the flowing fluid from the measuring transducer.

20. The measuring transducer of claim 19, wherein each of the first and second connecting flanges includes a sealing surface configured to enable a fluid-tight or leak-free connection of the tube assembly to the respectively corresponding line segment of the process line.

21. The measuring transducer of claim 20, wherein each sealing surface of each of the first and second connection flanges respectively has a smallest diameter of more than 100 mm and/or a diameter defining a nominal diameter of the measuring transducer, and/or
- wherein a smallest distance between each sealing surfaces of the first and second connecting flanges respectively defines an installation length of the tube assembly or of the measuring transducer formed therewith, wherein the installation length is more than 1000 mm and/or less than 3000 mm.

22. The measuring transducer of claim 1, further comprising a transducer housing encasing the first, second, third and fourth tubes and configured such that the transducer housing has a compressive strength of more than 50 bar, wherein the transducer housing includes at least one cavity, and wherein each of the first, second, third and fourth tubes is disposed within said cavity.

23. The measuring transducer of claim 1, wherein each of the first, second, third and fourth tubes is configured to conduct fluid in its respective lumen from the respective first end toward the respective second end while enabling the respective tube to vibrate.

24. A vibronic measuring system for measuring and/or monitoring at least one of a mass flow rate, a volume flow rate, a flow velocity, a density and a viscosity of a flowing fluid, the measuring system comprising:
- the measuring transducer according to claim 1; and
- an electronic measuring and operating system electrically coupled to both the exciter assembly and the sensor assembly, the measuring and operating system including at least one microprocessor and/or at least one digital signal processor.

25. The vibronic measuring system according to claim 24, wherein the measuring and operating system is configured to generate exciter signals as to feed and/or control the measuring transducer, and/or
wherein the measuring and operating system is configured to receive and process vibration signals generated by the measuring transducer and to determine at least one of:
a mass flow measurement value representing a mass flow rate of the fluid;
a density measurement value representing a density of the fluid; and
a viscosity measurement value representing a viscosity of the fluid.

26. A method for measuring and/or monitoring a mass flow rate of a fluid flowing in a pipeline, the method comprising:
providing the vibronic measuring system of claim 24;
fluidically connecting the vibronic measuring system to the pipeline; and
measuring and/or monitoring the mass flow rate of the fluid in the pipeline,
wherein the mass flow rate is more than 800 t/h, and wherein the pipeline has a nominal diameter of more than 100 mm.

27. A measuring transducer for a vibronic measuring system configured to measure at least one of a mass flow, a density and a viscosity of a flowing fluid, the measuring transducer comprising:
a tube assembly having an inlet side and an outlet side, which tube assembly includes:
a curved first tube that is, at least in sections, V-shaped and/or one-piece;
a curved second tube that is structurally identical to the first tube;
a curved third tube that is, at least in sections, V-shaped and/or one-piece;
a curved fourth tube that is structurally identical only to the third tube;
a first flow divider adapted as a line branching unit and/or located on the inlet side and including four flow openings; and
a second flow divider structurally identical to the first flow divider and/or adapted as a line merging unit and/or located on the outlet side and including four flow openings;
an exciter assembly configured to induce and maintain mechanical vibrations of the tube assembly, including bending vibrations of each of the first, second, third and fourth tubes about a respective rest position; and
a sensor assembly configured to sense mechanical vibrations of the tube assembly, including the bending vibrations of each of the first, second, third and fourth tubes about the respective rest position, and to generate vibration measurement signals respectively representing vibrational movements of one or more of the first, second, third, and fourth tubes,
wherein each of the first, second, third and fourth tubes extends from a respective first end of the respective tube to a respective second end of the tube, each having a tube length corresponding to an extended length of a center line of the respective tube, a tube wall, and a lumen enclosed thereby,
wherein each of the first, second, third and fourth tubes is connected to each of the first and second flow dividers such that:
the first tube opens with its first end into a first flow opening of the first flow divider and with its second end into a first flow opening of the second flow divider;
the second tube opens with its first end into a second flow opening of the first flow divider and with its second end into a second flow opening of the second flow divider;
the third tube opens with its first end into a third flow opening of the first flow divider and with its second end into a third flow opening of the second flow divider; and
the fourth tube opens with its first end into a fourth flow opening of the first flow divider and with its second end into a fourth flow opening of the second flow divider,
wherein each of the first, second, third and fourth tubes respectively has at least:
a straight first segment connected to the first flow divider;
an arcuate second segment adjoining the first segment;
a straight third segment adjoining the second segment;
an arcuate fourth segment adjoining the third segment;
a straight fifth segment adjoining the fourth segment and identical in both shape and size to the third segment;
an arcuate sixth segment adjoining the fifth segment and identical in both shape and size to the second segment; and
a straight seventh segment adjoining the sixth segment, connected to the second flow divider, and identical in both shape and size to the first segment,
wherein each of the first, third, fifth and seventh segments has a segment length corresponding to a length of a respective longitudinal axis of the respective segment, and wherein each of the second, fourth and sixth segments has a segment length corresponding to an extended length of an arcuate center line of the respective segment, an arc radius corresponding to a radius of the arcuate center line, and a center point angle corresponding to a ratio of the segment length to the arc radius,
wherein each second segment is identical in both shape and size such that the segment length, arc radius and center point angle of each second segment are equal to the corresponding segment length, arc radius and center point angle, respectively, of each other second segment,
wherein each sixth segment is identical in both shape and size such that the respective segment length, arc radius and center point angle of each sixth segment are equal to the segment length, arc radius and center point angle, respectively, of each other sixth segments, and
wherein the fourth segments of the first and second tubes are larger than the fourth segments of the third and fourth tubes, respectively, such that the respective segment length of each fourth segment of the first and second tubes is greater than the respective segment length of each fourth segment of the third and fourth tubes by more than 30% and/or by less than 100%.

28. A measuring transducer for a vibronic measuring system configured to measure at least one of a mass flow, a density and a viscosity of a flowing fluid, the measuring transducer comprising:

a tube assembly having an inlet side and an outlet side, which tube assembly includes:
  a curved first tube that is, at least in sections, V-shaped and/or one-piece;
  a curved second tube that is structurally identical to the first tube;
  a curved third tube that is, at least in sections, V-shaped and/or one-piece;
  a curved fourth tube that is structurally identical only to the third tube;
  a first flow divider adapted as a line branching unit and/or located on the inlet side and including four flow openings; and
  a second flow divider structurally identical to the first flow divider and/or adapted as a line merging unit and/or located on the outlet side and including four flow openings;
an exciter assembly configured to induce and maintain mechanical vibrations of the tube assembly, including bending vibrations of each of the first, second, third and fourth tubes about a respective rest position; and
a sensor assembly configured to sense mechanical vibrations of the tube assembly, including the bending vibrations of each of the first, second, third and fourth tubes about the respective rest position, and to generate vibration measurement signals respectively representing vibrational movements of one or more of the first, second, third, and fourth tubes,
wherein each of the first, second, third and fourth tubes extends from a respective first end of the respective tube to a respective second end of the tube, each having a tube length corresponding to an extended length of a center line of the respective tube, a tube wall, and a lumen enclosed thereby,
wherein each of the first, second, third and fourth tubes is connected to each of the first and second flow dividers such that:
  the first tube opens with its first end into a first flow opening of the first flow divider and with its second end into a first flow opening of the second flow divider;
  the second tube opens with its first end into a second flow opening of the first flow divider and with its second end into a second flow opening of the second flow divider;
  the third tube opens with its first end into a third flow opening of the first flow divider and with its second end into a third flow opening of the second flow divider; and
  the fourth tube opens with its first end into a fourth flow opening of the first flow divider and with its second end into a fourth flow opening of the second flow divider,
wherein each of the first, second, third and fourth tubes respectively has at least:
  a straight first segment connected to the first flow divider;
  an arcuate second segment adjoining the first segment;
  a straight third segment adjoining the second segment;
  an arcuate fourth segment adjoining the third segment;
  a straight fifth segment adjoining the fourth segment and identical in both shape and size to the third segment;
  an arcuate sixth segment adjoining the fifth segment and identical in both shape and size to the second segment; and
  a straight seventh segment adjoining the sixth segment, connected to the second flow divider, and identical in both shape and size to the first segment,
wherein each of the first, third, fifth and seventh segments has a segment length corresponding to a length of a respective longitudinal axis of the respective segment, and wherein each of the second, fourth and sixth segments has a segment length corresponding to an extended length of an arcuate center line of the respective segment, an arc radius corresponding to a radius of the arcuate center line, and a center point angle corresponding to a ratio of the segment length to the arc radius,
wherein each second segment is identical in both shape and size such that the segment length, arc radius and center point angle of each second segment are equal to the corresponding segment length, arc radius and center point angle, respectively, of each other second segment,
wherein each sixth segment is identical in both shape and size such that the respective segment length, arc radius and center point angle of each sixth segment are equal to the segment length, arc radius and center point angle, respectively, of each other sixth segments, and
wherein at least one of:
  the arc radius of each fourth segment of the first and second tubes is greater than the respective arc radius of each fourth segment of the third and fourth tubes by 100%; and
  the first, second, third and fourth tubes are configured and arranged such that the fourth segments or the arcuate center line of the fourth segments in a projection onto a first plane of symmetry extend parallel to each other.

* * * * *